(12) United States Patent
Fujihara

(10) Patent No.: US 7,222,125 B2
(45) Date of Patent: May 22, 2007

(54) DATA STRUCTURE MANAGING DEVICE, DATA STRUCTURE MANAGING SYSTEM, DATA STRUCTURE MANAGING METHOD, AND RECORDED MEDIUM WHERE DATA STRUCTURE MANAGING PROGRAM IS STORED

(75) Inventor: Mutsumi Fujihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 317 days.

(21) Appl. No.: 10/149,822

(22) PCT Filed: Dec. 13, 2000

(86) PCT No.: PCT/JP00/08815

§ 371 (c)(1),
(2), (4) Date: Jun. 13, 2002

(87) PCT Pub. No.: WO01/42924

PCT Pub. Date: Jun. 14, 2001

(65) Prior Publication Data

US 2002/0191452 A1     Dec. 19, 2002

(30) Foreign Application Priority Data

Dec. 13, 1999 (JP) .............................. 11-353630

(51) Int. Cl.
*G06F 17/30* (2006.01)
(52) U.S. Cl. ...................... 707/101; 707/100
(58) Field of Classification Search ............... 707/101, 707/1; 711/136
See application file for complete search history.

(56) References Cited

U.S. PATENT DOCUMENTS 5,379,422 A * 1/1995 Antoshenkov ............... 707/1
5,758,356 A   5/1998 Hara et al.
5,805,537 A * 9/1998 Yamamoto et al. ..... 369/124.09
6,115,721 A * 9/2000 Nagy ........................ 707/202
6,141,731 A * 10/2000 Beardsley et al. .......... 711/136

FOREIGN PATENT DOCUMENTS

| EP | 0 657 830 A1 | 6/1995 |
| JP | 63-106860 | 5/1988 |
| JP | 8-137914 | 5/1996 |
| JP | 11-167510 | 6/1999 |

\* cited by examiner

*Primary Examiner*—Don Wong
*Assistant Examiner*—Sheree Brown
(74) *Attorney, Agent, or Firm*—Oblon, Spivak, McClelland, Maier & Neustadt, P.C.

(57) ABSTRACT

In the case where there is a plurality of data structures deployed in one or a plurality of storage units, while reducing communication traffic, easy yet efficient maintenance and management of a plurality of data structures is implemented. A data structure management apparatus according to the present invention is a data structure management apparatus (10), which manages a plurality of mutually equal data structures stored in one or a plurality of storage units, comprising a data structure storage unit (20), which stores an arbitrary first data structure; a data structure modification unit (105), which modifies the first data structure; a modified data extraction unit (107), which extracts only the data necessary for making the first data structure on the modification source side and a second data structure on the modification target side be equal, from the modified data in the first data structure by the data structure modification unit; and a modified data transmission unit (111), which outputs the extracted, modified data so as to reflect onto the second data structure.

17 Claims, 22 Drawing Sheets

POT IF TREE IS EMPTY

POT/ROOT RELATIONSHIP

IF THERE ARE NO CHILDREN

IF THERE IS ONLY RIGHT CHILD

IF THERE IS ONLY LEFT CHILD

IF THERE ARE BOTH LEFT AND RIGHT CHILDREN

FIG. 17
(a)
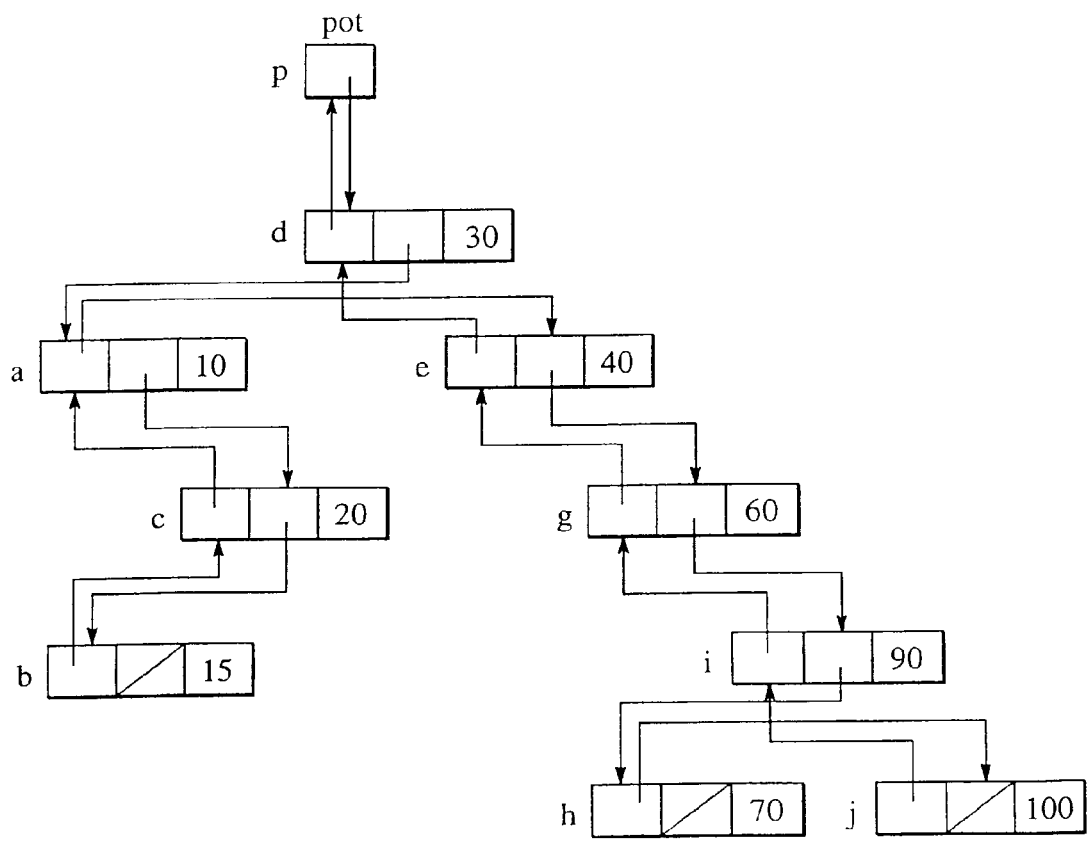
(b)

FIG. 22
(a)
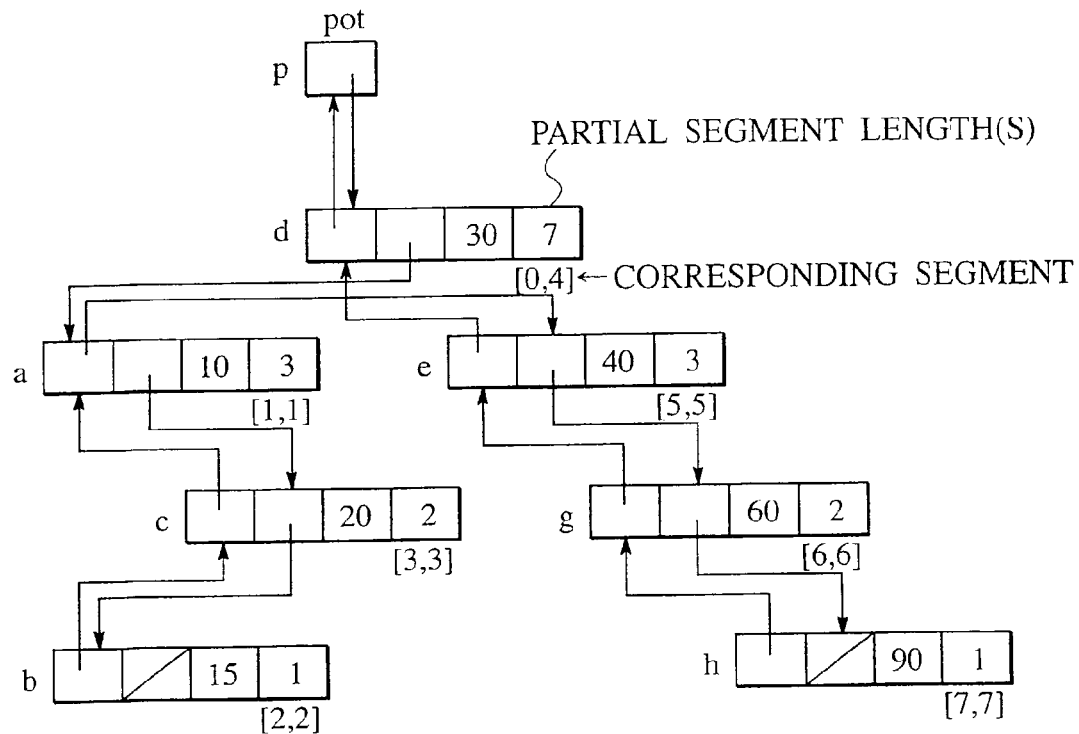
(b)
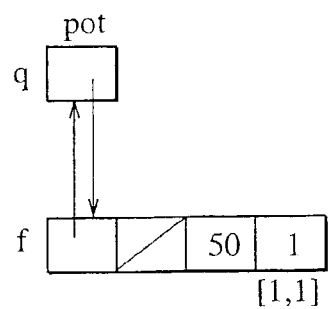

FIG. 23
(a)
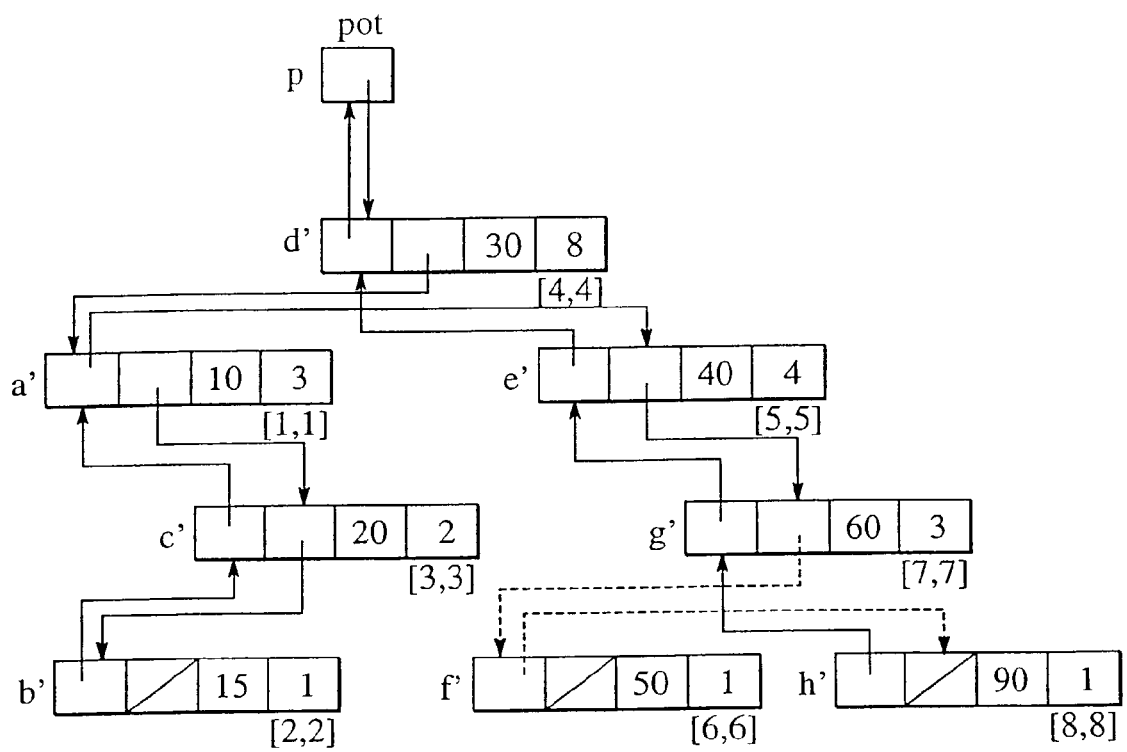
(b)
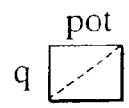

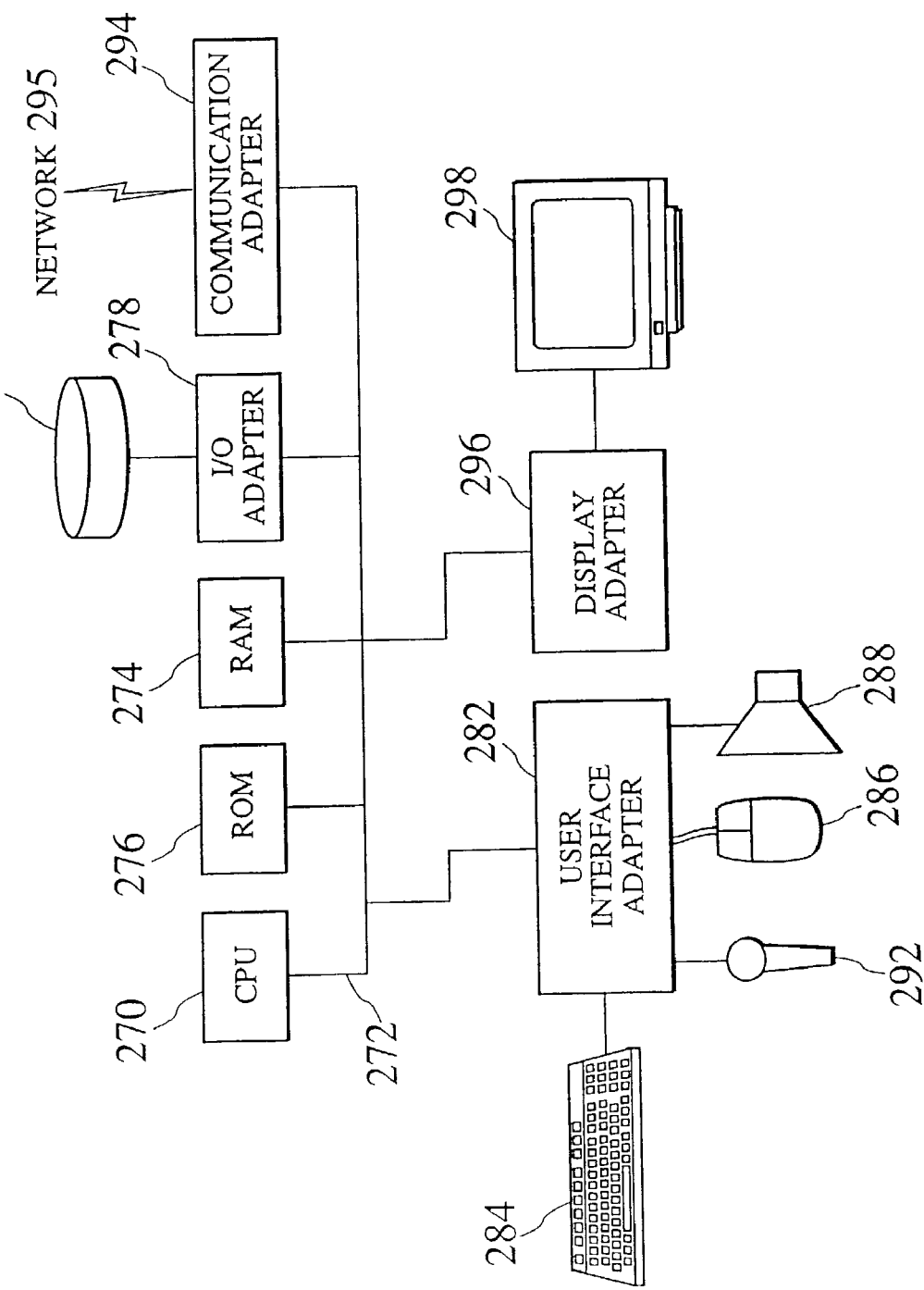

DATA STRUCTURE MANAGING DEVICE, DATA STRUCTURE MANAGING SYSTEM, DATA STRUCTURE MANAGING METHOD, AND RECORDED MEDIUM WHERE DATA STRUCTURE MANAGING PROGRAM IS STORED

Data structure management apparatus, data structure management system, data structure management method, and computer readable recording medium for recording a data structure management program.

TECHNICAL FIELD OF THE INVENTION

The present invention relates to a data structure management apparatus, data structure management system, data structure management method, and computer readable recording medium for recording a data structure management program. In particular, in the case where there is a plurality of data structures deployed in one or a plurality of computer storage units, it relates to technology for reducing communication traffic and implementing easy yet efficient maintenance and management of a plurality of data structures by conveying to another data structure only the modified data that is necessary for maintenance of equivalency between a certain data structure and another data structure so as to reflect onto the other data structure.

BACKGROUND OF THE INVENTION

Conventionally, various data structures are constructed by storing pointers with a certain technique in Random Access Memory (hereinafter referred to as "RAM") having one or more addresses, which is a typical main memory of a computer, to promote efficiency of information expression and increase the speed of operation.

For instance, there are techniques for expressing structures among a plurality of data as a linear list, binary tree, tree, or various graphs by storing a certain pointer for another node in a portion of RAM corresponding to the first node. Those data structures provide certain fixed operations and functions.

However, there has been no known effective maintenance/management techniques for providing equivalency among the functions of a plurality of data structures arranged upon one or a plurality of RAM.

A conventional technique for maintaining equivalency among a plurality data structures is described below.

First, there is a technique for securing functional equivalency among a plurality of data structures by performing with exactly the same content and sequence all of the update operations that modify a data structure function and the search operation required for this update operation, not just for a single data structure but also for each of the plurality of data structures.

However, with the first technique, the hassle or the calculation time, required to maintain and manage other data structures that should be reflected an update (modification) (hereinafter referred to as "the copy side data structure") is the same as the hassle required to maintain and manage the data structure on the modification source side (hereinafter referred to as "the master side data structure").

More specifically, in order to modify the data structure, in many cases a complex search operation is performed before this modification, and depending on the result of the search the details of the modification vary. Accordingly, with the first technique, unless the same modification procedure including the required search performed for the master side data structure is also performed for the copy side data structure, equivalency between both structures may not be provided. However, with the first technique, the modification processing for the master side data structure and the modification reflecting processing for the copy side data structure require the same amount of calculation time (resources). As a result, there is not much difference between the two sides as far as marginal space allowing other processing such as a search only request to be performed. Accordingly, considerable calculation time is required to implement equivalency among the data structures, and effective division of the processing may not be implemented in a dispersion environment where, for instance, many search requests that are different from the master side are performed on the copy side while the master side concentrates on the processing of the modification requests. In short, it has been impossible with this first technique to effectively reflect only those modifications made to a data structure onto the other data structures and reduce the cost of managing other data structures.

Secondly, there is a technique that, in order to maintain the data structure including the pointer values exactly the same as the content of RAM, all the pointers modified in the course of a modification operation are transmitted one by one and reflected onto the modification target side. With this second technique, the respective data structures (more precisely, each node configuring the respective data structures) are stored in RAM in a portion that is considered to be the same address, and an update (that is, pointer modification information) to one of data structures is copied into RAM which represents other data structures as modifications in the memory content of each address. As long as means for performing appropriate address conversions is employed, a plurality of equivalent data structures may be configured by storing the pointers of identical expressions in the same address in a single storage unit (or computer) or among a plurality of storage units (or computers). Modifications in a data structure may be reflected onto other data structures by structuring a plurality of data structures in this manner and simply copying the pointers as with the other data (codes).

However, the second technique may not be applied to some data structures that are functionally equivalent but allow the pointer structure to take on different forms. For instance, there is a data structure, which is called self-adjusting data structure, that appropriately adjusts pointer structure so that a frequently accessed node becomes a root node. This self-adjusting data structure changes the data structure format to another functionally equivalent format even with a search operation that does not accompany a functional modification. With this self-adjusting data structure, in order to make the stored pointer values match and maintain equivalency, all modifications to the pointer values (the content of each address) that occur as a result of all operations including search operation must be copied. This copying requires transmission of an enormous amount of pointer modification information to the other data structures (or other means for managing data structure), thus the communication traffic in addition to the hassle of managing becomes considerable.

Otherwise, in the case of a data structure such as a high-balanced tree, a large number of pointers may be modified with one modification operation, and as a result, the amount of modified data that must be transmitted increases. Also, in the second technique, there is a restriction whereby the configuration (form) of the data structures on the master side and the copy side must match completely.

More specifically, in the case of a binary tree data structure, not only must they be equivalent as far as the binary search tree but also all parent/child relationships among the same corresponding nodes should coincide. (However, if the above address conversion is carried out appropriately, the address of each node and the pointer value do not have to be the same.) In other words, with this second technique, a data structure that is equivalent as a binary search tree between the master side and the copy side, but is different in terms of a specific binary tree structure cannot be used.

For that reason, for instance, when the tree configurations on the master side and the copy side are managed with completely different techniques, in other words, for instance, in the case where the master side utilizes the high-balanced-tree described above so as to manage the tree configuration whereas the copy side utilizes a splay tree so as to perform the search operation, even when the tree configuration is to be modified, the data structure configuration (that is, the form of the tree) before the modification is made and the data structure configuration on the copy side before having to reflect the modified data are completely different. Accordingly, when simply the master side data structure is modified, the modified pointer may not be reflected in the copy side data structure.

In particular, if an attempt is made to implement equivalency among a plurality of data structures arranged respectively upon the main memory of physically different computers using the first or second technique described above, considerable burden would be imposed on the data transmission channel (network) connecting these computers and significant influence imparted to the system as a whole including the data transmission channel.

Moreover, even with the various balanced trees, which are data structures where the form of the data structure is modified only in the case of an update operation, a large number of pointers are modified along with the form modification. As a result, in order to transmit all the modified information of those pointers, although not to the extent as the above-described self-adjusting data structure, considerable load ends up being applied to the data transmission channel that connects each RAM stored with the data structures.

The present invention is brought forth to solve problems of conventional data structure management techniques such as, as described above, the fact that the maintenance/management for the purpose of accomplishing equivalency among the functions of a plurality of data structures arranged upon one or a plurality of RAM requires a great deal of calculation time, there is a large volume of communication, and thus is inefficient.

In addition, an objective thereof is to provide a data structure management apparatus, a data structure management system, a data structure management method, and storage media for storing a data structure management program, which are capable of efficiently maintaining and managing equivalency among a plurality of data structures efficiently by reflecting a modification made to a data structure arranged on one or a plurality of RAM (storage regions) onto the other data structures with the least amount of traffic and calculation time.

Yet another objective of the invention is to maintain and manage the equivalence easily among a part of or the whole data structure arranged on the address unique to each other.

SUMMARY OF THE INVENTION

The present invention extracts from pointer modification data for a certain data structure the modified data required to maintain functional equivalence among a plurality of data structures based on a predetermined standard configuration and transmits only the extracted modified data to a data structure onto which the modification should be reflected.

In order to implement such a function, a data structure management system, according to the present invention, focuses on modifications of pointer information in the standard configuration of an arbitrary data structure, generates modified data by omitting from the modified pointer information the pointer values that can possibly be assumed or restored if the standard configuration is assumed, and transmits it to the copy side data structure(s) that must have equivalence with the master side data structure maintained. Through this, the modification data communications traffic may be reduced and the processing time for modification reflection processing reduced without alerting the data structure modification program.

Alternatively, in place of pointer information, relative location information may be sent to copy-formatted data structure.

BRIEF DESCRIPTION OF THE DRAWINGS

FIG. 17 is a diagram showing an example of a copy side data structure that differs from the master side data structure.

FIG. 22 is a diagram showing an example of a data structure according to the second embodiment.

FIG. 23 is a diagram showing an example of a data structure obtained by adding a node f to the data structure in FIG. 22.

FIG. 27 is a diagram showing an example of the hardware configuration of each apparatus according to the present invention.

PREFERRED EMBODIMENTS OF THE INVENTION

Hereafter, the preferred embodiments according to the present invention of a data structure management apparatus, a data structure management system, a data structure management method and recording media, which store a data structure management program, is described in detail while referencing FIG. 1 through FIG. 27.

First Embodiment

The following describes the first embodiment according to the present invention of a data structure management apparatus, a data structure management system, a data structure management method, and recording media, which store a data structure management program, with reference to FIG. 1 through FIG. 20. The first embodiment constructs the data structures of the binary search tree on a plurality of RAM and provides the function of efficiently maintaining functional equivalency among these data structures.

Figure 1:
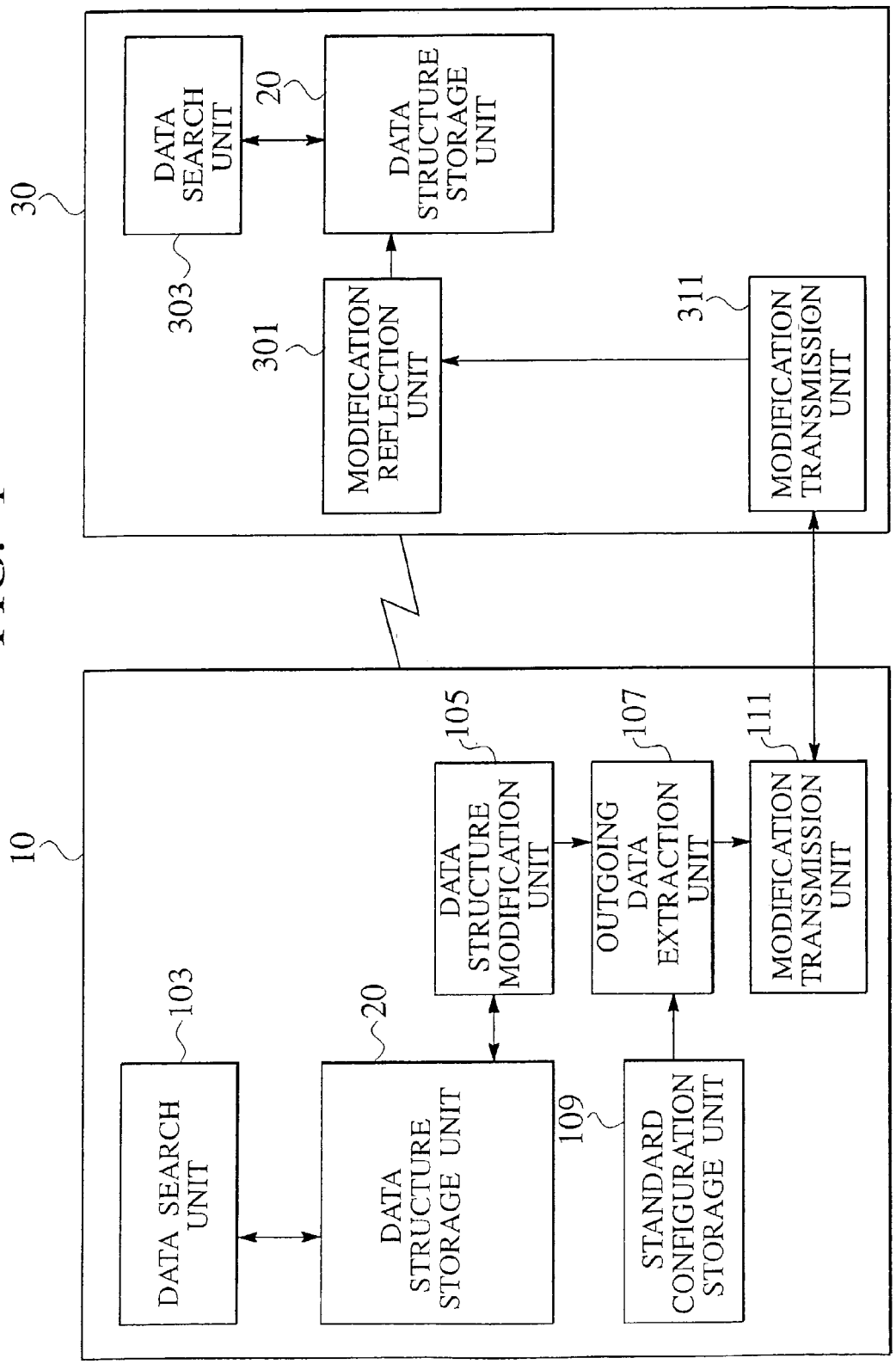
FIG. 1 is a block diagram showing a functional configuration of a data structure management system according to a first embodiment of the present invention.

FIG. 1 is a block diagram that shows the general functional configuration of the data structure management system according to the first embodiment. As shown in FIG. 1, a master side data structure management apparatus 10 according to the first embodiment is configured of a data structure storage unit 20, a data search unit 103, a data structure modification unit 105, an outgoing data extraction unit 107, a standard configuration storage unit 109, and a modification transmission unit 111. A copy side data structure management apparatus 30 according to the first embodiment is configured by a data structure storage unit 20, a data search unit 303, a modification reflection unit 301, and a modification reception unit 311. Further, the configuration in FIG. 1 is an example of a master-slave type composition, where the data structure storage unit 20 of the data structure management apparatus 10 is the master, and modifications of the master data structure are reflected onto the data structure storage unit 20 of the copy side data structure management apparatus 30. The first embodiment may be arbitrarily configured with other structures such as a pier-to-pier type structure where a plurality of data structure management apparatus, which have the structures of both the data structure management apparatus 10 and the data structure management apparatus 30, are interconnected allowing reciprocal exchange of the data structure modification data. Furthermore, the configuration in FIG. 1 is described as having a single data structure on the copy side whereupon modification should be reflected; however, there may be a plurality of data structures on the copy side as long as the communication function is capable of transmitting identical modified data to a plurality of targets.

In the first embodiment, with the communication function provided by the modification transmission unit 111 and the modification reception unit 311, the modification reflection unit 301 reflects the transmitted modified data upon the data structure of the copy side data structure storage unit 20. After this modification data is reflected upon the copy side data structure storage unit 20, the data search unit 103 of the master side data structure storage unit 20 and the data search unit 303 of the copy side data structure storage unit 20 function with complete parity. In other words, both data structure storage units 20 can return the same result for the same search request. Therefore, data can be shared between the master and the copy through implementing equivalency of both data structures.

The data structures of the master side and copy side data structure storage units 20 are arbitrary data structures, which are functionally equivalent to each other. Here, functionally equivalent means having each node in the same logical sequence (sorting sequence, in the case of this embodiment), namely, a functional equivalence; however, the pointer structures themselves may be different from each other.

Data search units 103 and 303 search for data within the data structures, which are respectively stored in the data structure storage units 20, in accordance with a request from the application.

The data structure modification unit 105 in the master side data structure management apparatus 10 appropriately modifies the master side data structure, which is stored in the data structure storage unit 20, and communicates the modified pointer information or modified data to the outgoing data extraction unit 107.

The outgoing data extraction unit 107 extracts only the pointer information that changes the logical sequence of each node in the data structure from the modified data by referencing the standard data structure stored in the standard configuration storage unit 109, sending this extracted pointer information to the modification transmission unit 111.

The modification transmission unit 111 transmits the extracted pointer information to the modification reception unit 311, in the same RAM or the same computer as the master side data structure management apparatus 10, or in another computer connected either locally or remotely.

Meanwhile, the modification reception unit 311 in the copy side data structure management apparatus 30 sends to the modification reflection unit 301 the pointer information (modified data), which is received from the modification transmission unit 111 of the master side data structure management apparatus 10.

The modification reflection unit 301 reflects the pointer information (modified data), which is received from the modification reception unit 311, onto the copy side data structure, which is stored in the data structure storage unit 20.

Next, the hardware configuration of the data structure management apparatus according to the first embodiment is described. The data structure management apparatus 10 and the data structure management apparatus 30 in the data structure management system according to the present invention are integrated in a any of a variety of independent computers, which include, for example, so-called general-purpose machines, workstations, PCs, network terminals, and various mobile terminals, or in a system, mutually connected to each computer.

FIG. 27 is a block diagram showing the hardware configuration of each apparatus configuring the data structure management system according to each embodiment of the present invention.

The data structure management apparatus 10 and 30 according to each embodiment of the present invention have, for example, either the entire or a part of the computer configuration shown in FIG. 27.

As shown in FIG. 27, the computer comprises a central processing unit 270 such as a microprocessor and many other units mutually connected via a system bus 272. This computer is equipped with, for example, a random access memory 274; a read-only memory 276; an I/O adapter 278, which connects peripheral equipment such as a hard disk device 280 to the system bus 272; a user interface adapter 282, which connects to the system bus 272 user interface devices such as a key board 284, a mouse 286, a speaker 288, a microphone 292 or a touch screen (not shown); user interface devices 284, 286, 288, and 292; a communication adapter 294, which connects this computer system to a communication network; a display adapter 296, which connects a display apparatus 298 to the system bus 272; an external disk driver, which drives a floppy disk, an optical disk, various memory cards and the like, respectively; and an external storage unit.

By storing programs for executing each function for the data structure management processing of the present invention in the various computer readable recording media, which are represented by these floppy disks, optical disks, and variety of memory cards, and performing a predetermined read out operation from these storage media using the external disk driver, these programs for executing each function of the data structure management processing of the present invention, which is stored in these recording media, may be installed in the computer system. The data structure management processing of the present invention is provided through the loading of these programs into the random access storage unit 274, and execution by the central processing unit 270. Alternatively, the data structure management processing of the present invention is provided through transmission of either all or a part of these programs to the data structure management apparatus 10 and 30 and the execution by the central processing unit 101. It should be noted that [storage] media include commonly used units, which are capable of [storing] programs, such as memory, magnetic disks, and optical disks.

Next, processing of the data structure management system according to the first embodiment is described with an example where a plurality of data structures that should be shared are configured in RAM as a binary search tree.

Figure 2:
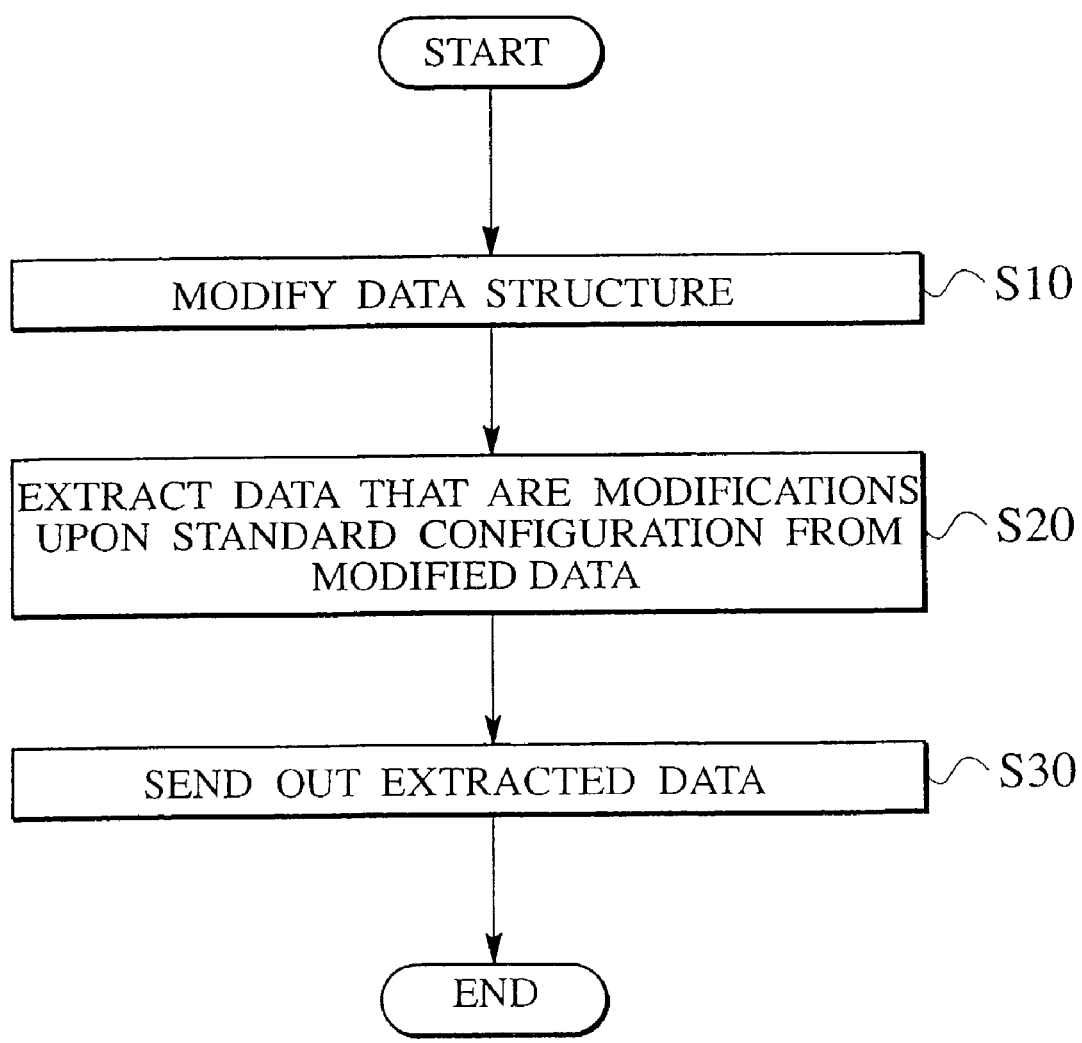
FIG. 2 is a flow chart showing an outline of the processing procedure of the data structure management method according to the first embodiment of the present invention.

FIG. 2 is a flow chart showing an outline of the processing of data structure modification and the reflection of modifications to other data structures performed by the data structure management system according to the first embodiment of the present invention. To begin with, the data structure modification unit 105 modifies the data structure, which is stored in the master side data structure storage unit 20 (Step S10). The outgoing data extraction unit 107 extracts the pointer information, which plays the role of changing the structure on the standard configuration stored in the standard configuration storage unit 109, from the modified pointer information in this data structure (Step S20). The modification transmission unit 111 transmits this extracted pointer information to the modification reception unit 311 of the copy side data structure management apparatus 30 (Step S30). The copy side data structure management apparatus 30 sends to the modification reflection unit 301 the modified data (pointer information), which is received by the modification reception unit 311. The modification reflection unit 301 updates the copy side data structure with the received modified data (pointer information) by accessing the data structure stored in the data structure storage unit 20.

To begin with, as an example of the data structure employed in the first embodiment, the representation method storing two pointers per node is described. Here, the pointers denote addresses of other nodes.

A binary tree may provide a bi-directional link from a parent to a child as well as from the child to the parent by only using two pointers per node.

Figure 3:
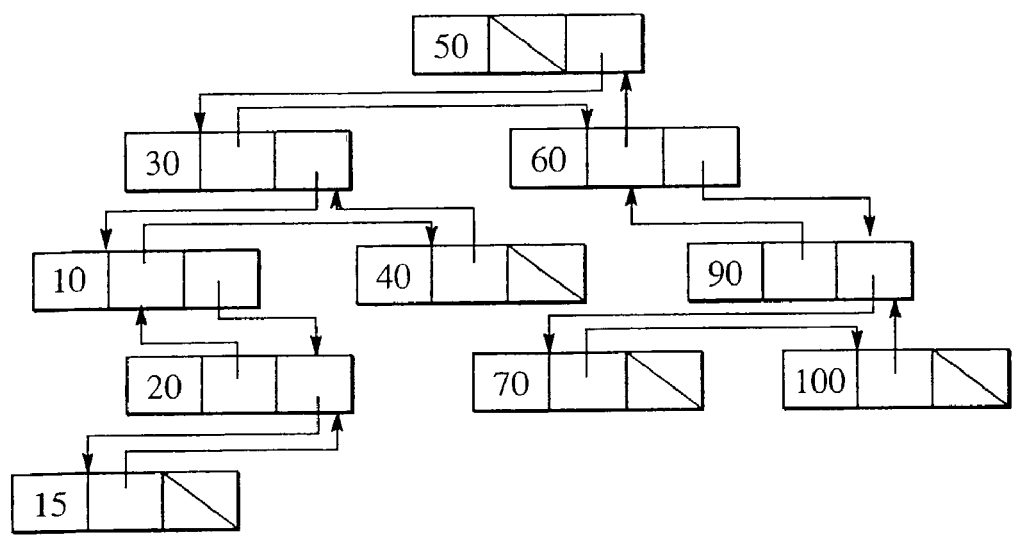
FIG. 3 is a diagram describing pointer structure in a binary tree with a two-pointer expression.

FIG. 3 describes a two-pointer representation method called leftmost-child-right-sibling representation, which implements theses bi-directional links.

Figure 4:
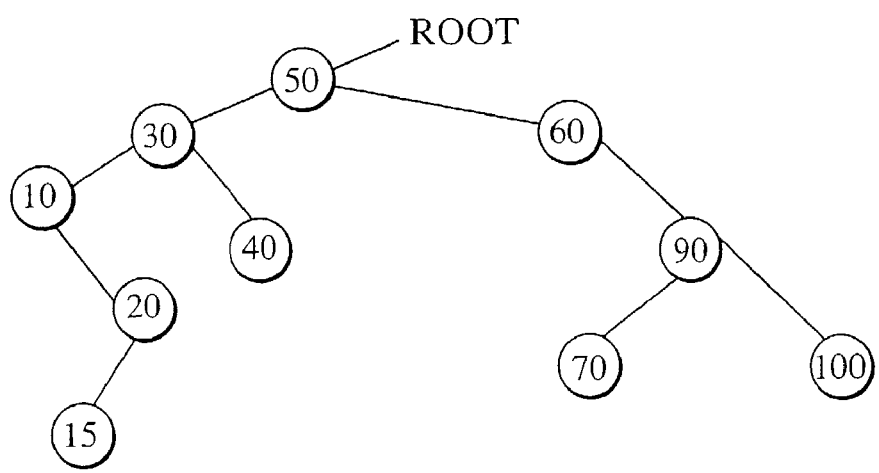
FIG. 4 is a diagram describing tree structure in the binary tree of FIG. 3.

FIG. 4 shows the two-pointer representation method of FIG. 3 as a representation with binary trees, wherein each of the nodes is connected like a tree.

In FIG. 3, the two pointers of each node points to a node according to the situation, as follows:

(1) One pointer (right)

If there is a left child, then the pointer points to the left child; if there is no left child and there is a right child, it points to the right child.

If there are no children, the pointer is nil (void pointer).

(2) The other pointer (left)

If self is a left child and has a right sibling (the right child of the self's parent), then the pointer points to the right sibling; in other cases where there is a parent, namely, it is not the root node, the pointer points to the parent.

In the case where there is no parent, namely, it is the root node, the pointer is nil (void pointer).

Note that it may easily be overlooked when looking at an appropriately arranged diagram as in FIG. 3, however, in the case where a certain node has only one of either a left or right child, which of the left or right child is being pointed at cannot be determined just by looking at the pointer pointing to the child (right). In order to differentiate whether this child is left or right, one-bit of extra information is required for each node. The content of this one-bit information may indicate whether each node is left or right. Alternatively, the pointer for the child of each node may indicate either left or right child. In the case of a binary search tree, it is possible to determine whether it is the left or right child by comparing keys. However, this method cannot be used when a plurality of nodes have identical keys. Generally, this one-bit information is necessary for constructing the binary tree structure.

On the other hand, as for the other (left) pointer pointing to a sibling or a parent, whether it is pointing to the right sibling or to the parent may be determined by tracing the pointer for a maximum of two times. In other words, the right pointer pointing to the right sibling is limited to when the left pointer of a node pointed at with the right pointer of a node, which is pointed by the right pointer, matches that node. However, it is necessary to obtain information regarding whether or not that node is the root from this pointer. In the above example, this can be determined by whether or not it is a void pointer.

As described above, a binary tree may be implemented by storing two pointers and one-bit of information per node. With this structure, an operation, which determines the left child from the parent, an operation, which determines the right child from the parent, and an operation, which determines the parent from the child, may respectively be executed similarly to a generally known structure that uses three pointers within a predetermined time frame. However, the executing time for these operations is longer than when using three pointers since two or more pointers and a bit are referenced for each operation. On the contrary, there is an advantage to the operations for modifying or setting the content of each node whereby the operating time is reduced due to the few number of pointers.

Next, the two-pointer type of node structure, which is utilized in the first embodiment, and its implementation in trees are specifically described.

To begin with, techniques of implementing the data structure, according to the first embodiment, in a memory unit (RAM) and the format of node pointers are described.

The storage unit to be used is configured with memory elements, which are attached with addresses, allowing arbitrary addresses to be stored in each memory element. In other words, addresses are used as pointers. Hereafter, when referring to the element of an address m, it is represented by [m].

Figure 5:
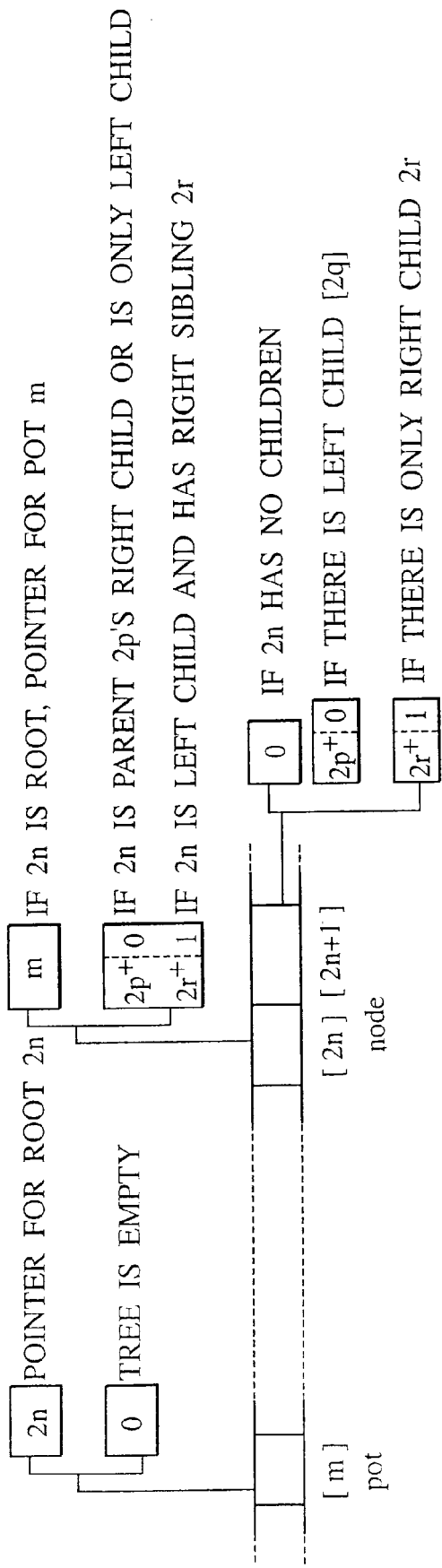
FIG. 5 is a diagram describing the pointer (address) stored in a node of a binary tree.
Figure 6:
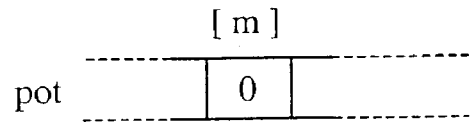
FIG. 6 is a diagram describing the pointer for a node of a pot in the case an empty tree.
Figure 7:
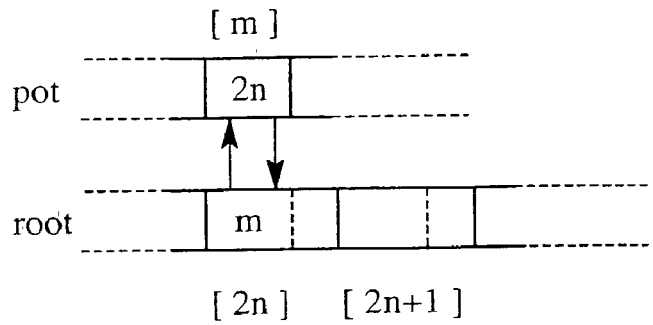
FIG. 7 is a diagram describing the node pointer relationship between a pot and a root.
Figure 8:
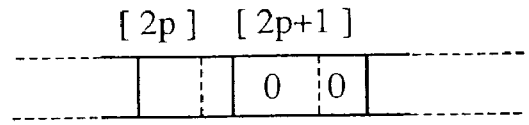
FIG. 8 is a diagram describing a node pointer with no children.
Figure 9:
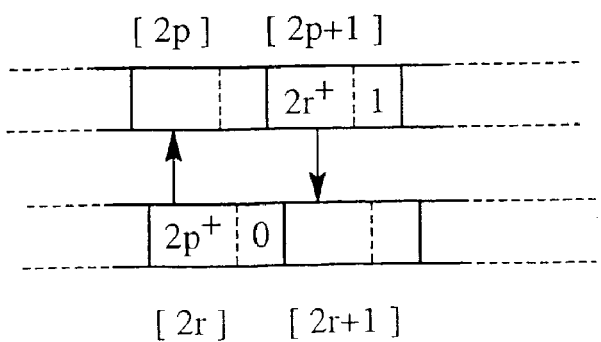
FIG. 9 is a diagram describing a node pointer with only a right child.
Figure 10:
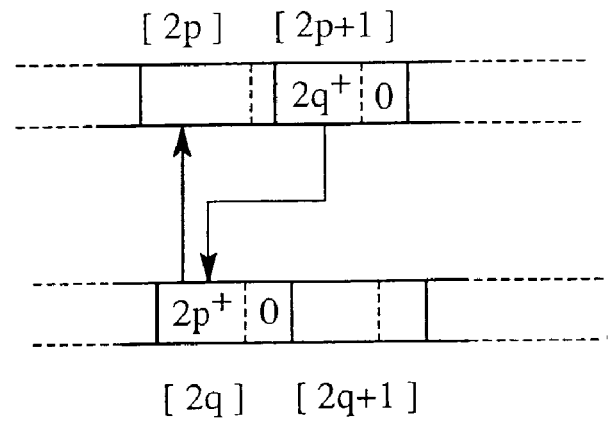
FIG. 10 is a diagram describing a node pointer with only a left child.
Figure 11:
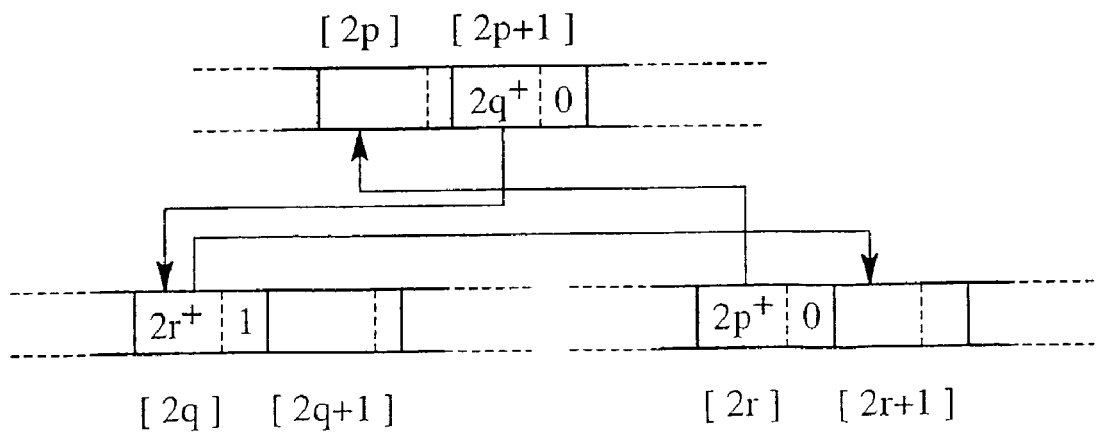
FIG. 11 is a diagram describing a node pointer with both left and right children.

As shown in FIG. 5, an even numbered address element [2n] and its following element [2n+1] are assigned to the pointer portion of a single node. In the case of designating a node, the even numbered address of that pointer portion is used. In other words, the nodes with [2n] and [2n+1] assigned thereto becomes [node 2n].

The pointer for the root of the binary tree, which is configured using these nodes, is stored in another element, and the whole including this other element is handled as a single data structure. The other memory element that stores the pointer for this root is called the pot of the tree. The pointer for the pot is stored in the root node instead of the pointer for the parent or right sibling. As shown in FIG. 5, when the pot address is m and the root node is 2n, 2n is set to [m], and m is set to [2m]. On the other hand, when the tree corresponding to the pot m is empty, 0 (nil) is set to [m]. It is one of the characteristics of the first embodiment to provide a pot that uniquely corresponds to a binary tree, which is a collection of nodes, and handle it as a unit in this manner.

It should be noted that since the address 0 is utilized as the nil pointer, [0] is not used as a node. However, it may be used as a pot. For the nil pointer, any address may be used for the nil pointer as long as it may be determined to be an address that is not corresponding to the memory element or an address that is not used as a node.

As shown in FIG. 5, in the case where the nodes 2n except for the root are left children and have right siblings 2r, 2r+1 is set to [2n]. In other circumstances, namely, when 2n is the left child and has no right sibling or 2n is the right child, the address 2p of the parent node 2p is set to [2n]. In the former, since the value of [2n] is an odd number (in other words, LSB is 1), it can be differentiated from the latter case where the value is an even number (that is, LSB is 0) by only the one least significant bit (LSB). Such distinction is not essential but effective in simplification of procedures and improvement in performance.

On the other hand, as shown in FIG. 5, 0 (nil) is set for the other pointer [2n+1] of each node 2n when the node has no children. In the case where 2n has a left child 2q, 2q is set to [2n+1] regardless of the existence of a right child. In the case where 2n has no left child but only a right child 2r, 2r+1 is set to [2n+1]. In the former, since the value of [2n+1] is an even number (LSB is 0), it may be differentiated from the latter case where the value is an odd number (LSB is 1) by only the one LSB.

There are the following 6 cases for the relationship of the above-mentioned pot, root, parent nodes, and children nodes.

a. If only pot, tree is empty (refer to FIG. 6)
b. If pot has corresponding tree (refer to FIG. 7)
c. If node has no children (refer to FIG. 8)
d. If node has only right child (refer to FIG. 9)
e. If node has only left child (refer to FIG. 10.)
f. If node has both a left and a right child (refer to FIG. 11.)

Based on the above-mentioned 6 cases, the connection information regarding the parent/sibling nodes can be determined with, for example, the nodes 2x as follows. It should be noted that regarding each of the determining conditions, which node of which of the cases a through f described above corresponds to 2x, is indicated in the comments.

```
(1) Determination of the parent/sibling of node 2x
if
    ([[2x]]=2x) then 2x is the root, and the pot is [2x]/* b. node 2n */
else if
    (([2x]&1)=1) then 2x is the left child, the parent is [[2x]−1], the right sibling is
[2x]−1    /*   f. node 2q   */
    else if
        ((([2x]+1]&1)=1) then 2x is the right child, the parent is [2x], and has no left
sibling        /*    d. node 2r    */
    else
        2x is the right child, the parent is [2x], and the left sibling is [[2x]+1]
                /*   f. node 2r   */
(2) Determination of the children of node 2x
if
    ([2x+1]=0) then 2x has no children
/* c.  node 2p   */
    else if
        ((([2x+1]&1)=1) then 2x has no left child and the right child is
```

-continued

```
    [2x+1]-1      /* d. node 2p  */
    else if
      ((([2x+1]]&1)=1) then the left child of 2x is [2x+1], and the right child is
    [[2x+1]]-1    /* f .node 2p  */
    else
      the left child of 2x is [2x+1] and has no right child
                      /* e. node 2p  */
```

In addition, the following procedure is available to be used as the procedure for modifying the binary trees configured as described above.

(1) Pot m is associated with the empty binary tree where the root is node 2n. In other words, the binary tree with the node 2n used as the root is associated. In this case, the structure is modified from the above-mentioned a. through b. Pointer m is set to [2n], and pointer 2n is set to [m].

(2) The node 2r is attached as the right child to the node 2p, which has no right child. In other words, the binary tree with the node 2r as the root is attached. Which of the above c or e is the condition of not having a right child can be identified by the above determination procedure.

In the case of modifications of the structure from c. to d., pointer 2p is set to [2r], and pointer 2r+1 is set to [2p+1]. On the other hand, in the case of modifications of the structure from e. to f., pointer 2p is set to [2r], and pointer 2r+1 is set to [[2p+1]].

(3) The node 2q is attached as the left child to the node 2p, which has no left child. In other words, the binary tree with the node 2q as the root is attached. Which of the above c. or e. is the condition of not having a left child can be identified with the above determination procedure.

In the case of modifications of the structure from c. to e., pointer 2p is set to [2q], and pointer 2q is set to [2p+1].

On the other hand, in the case of modifications of the structure from d. to f., [2p+1] is set to [2q], and pointer 2q is set to [2p+1].

(4) The node 2x or the sub-tree, which has the node 2x as the root, is separated from the parent node. Which of either 2q or 2r of d., e., and f. corresponds to node 2x may be identified through the above determination procedure.

If 2r of d., 0 (nil) is set to [[2x]+1].
If 2q of e., 0 (nil) is set to [[2x]+1].
If 2r of f., [2x] is set to [[2x]+1]].
If 2q of f., [2x] is set to [[2x]-1]+1].

Figure 12:
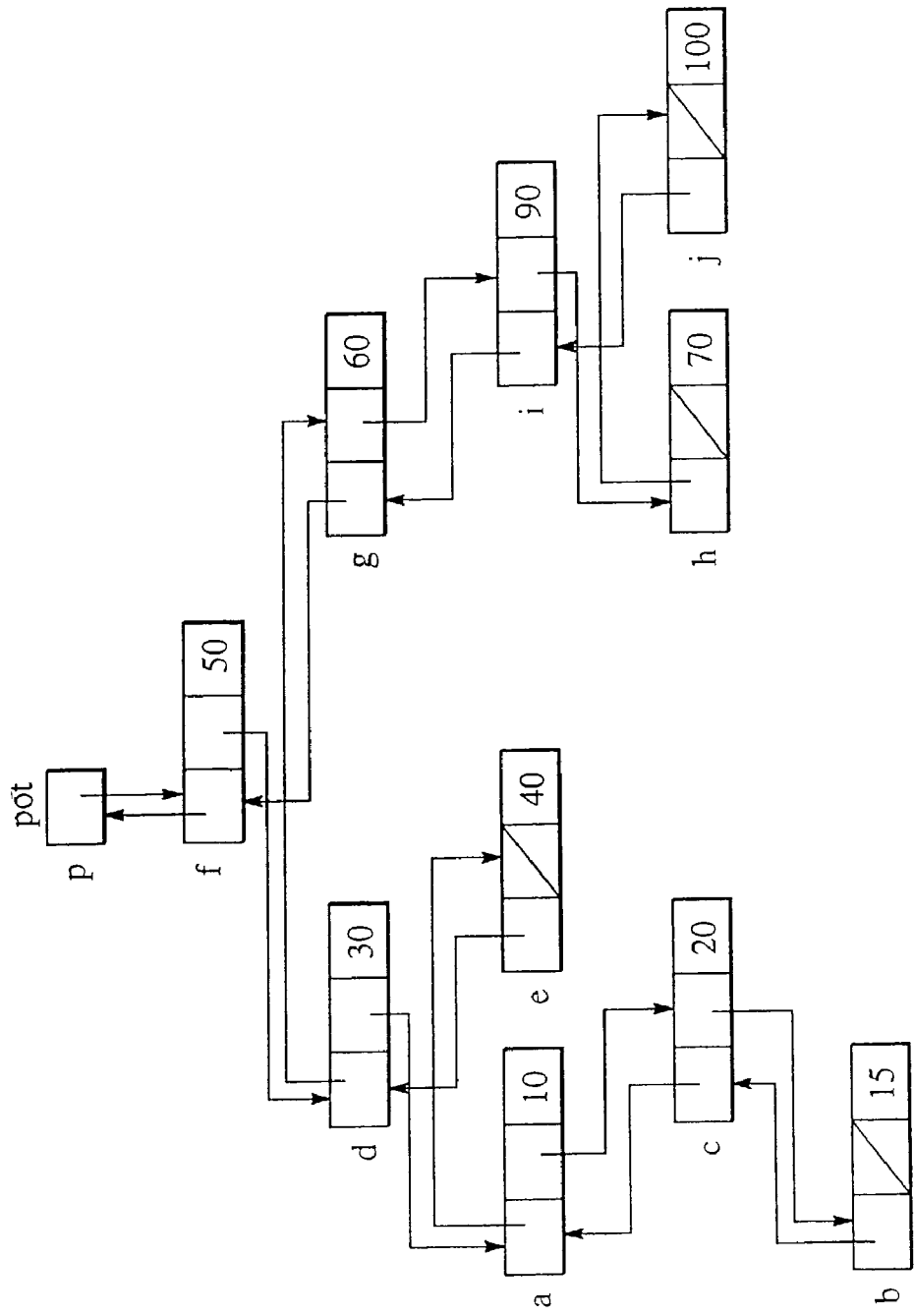
FIG. 12 is a diagram showing an example of a data structure wherein the binary tree in FIG. 3 is written to include a pot.

FIG. 12 is a diagram accurately showing the data structure, including the pot, wherein the binary trees in FIG. 3 and FIG. 4 are handled by the method of the first embodiment. Note that the start address of each node is an even numbered address.

Figure 13:
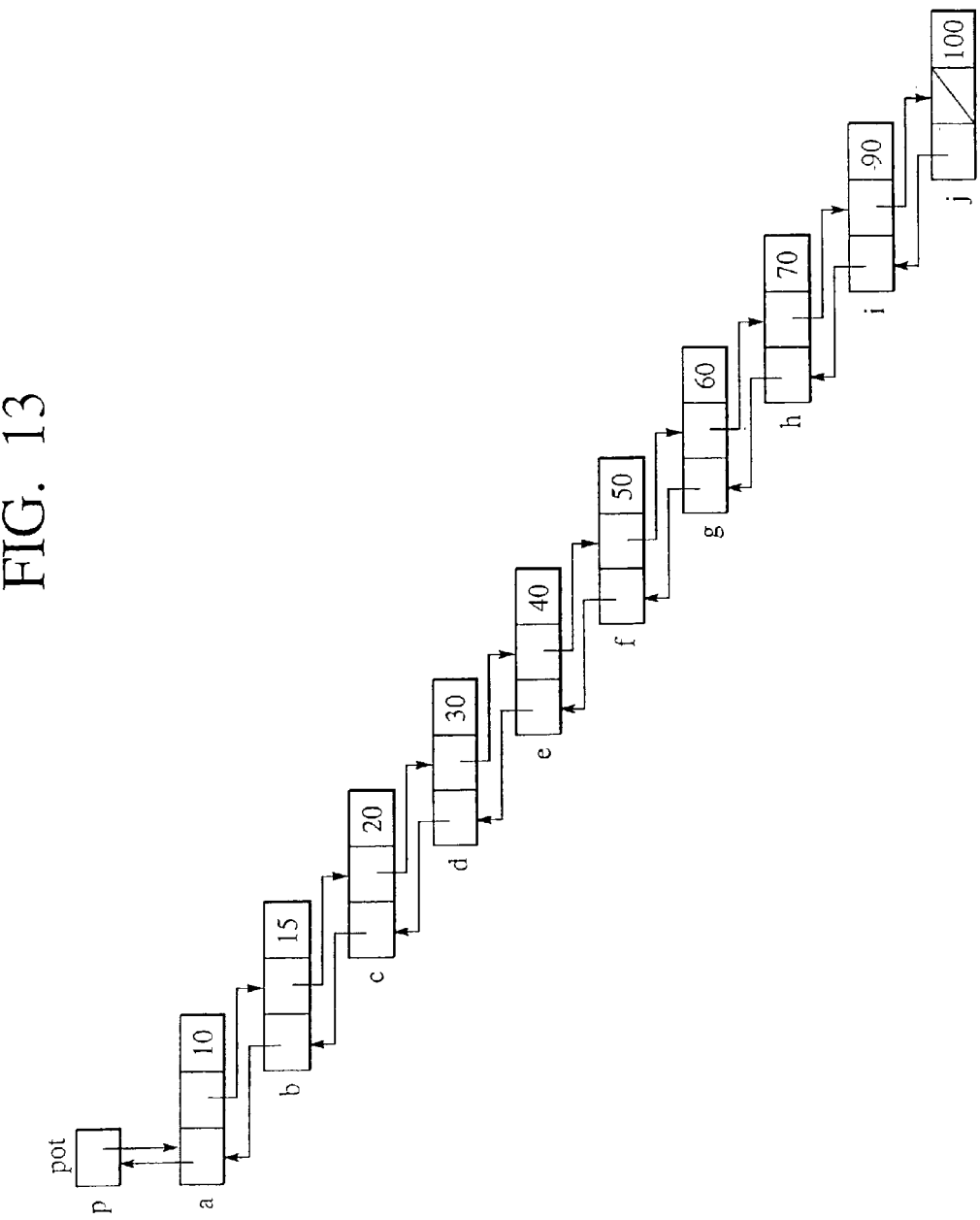
FIG. 13 is a diagram showing an example of a standard configuration equivalent to the data structure in FIG. 12.

FIG. 13 is a structure equivalent to the data structure in FIG. 12 used as a binary search tree. In this data structure, no nodes have left children. In other words, every node is one having only a right child or no children at all. In this data structure, from the root node a to the far end node j is sorted with a key in a descending or ascending order. Note that the addresses of the pot and nodes are identical to the data structure in FIG. 12. The data structure of the configuration in FIG. 13 is called a standard configuration. This standard configuration is stored in the standard configuration storage unit 109 and referenced by the outgoing data extraction unit 107.

Next, based on the data structure in FIG. 12, the procedure for data structure management processing according to the first embodiment is described in more detail.

The data structure management apparatus according to the first embodiment manages a plurality of data structures in the two-pointer representation of the above binary search tree as a plurality of equivalent representations of data, and by successively reflecting the modification subjected to one of these upon another data structure, makes them function amongst themselves as an identical (or equivalent) binary search tree.

The following describes the case where the data structure management system according to the first embodiment manages two data structures wherein the respective nodes and pots are arranged, for example, in the same addresses in the respective RAM of two computers, .

(1) Node Deletion

Figure 14:
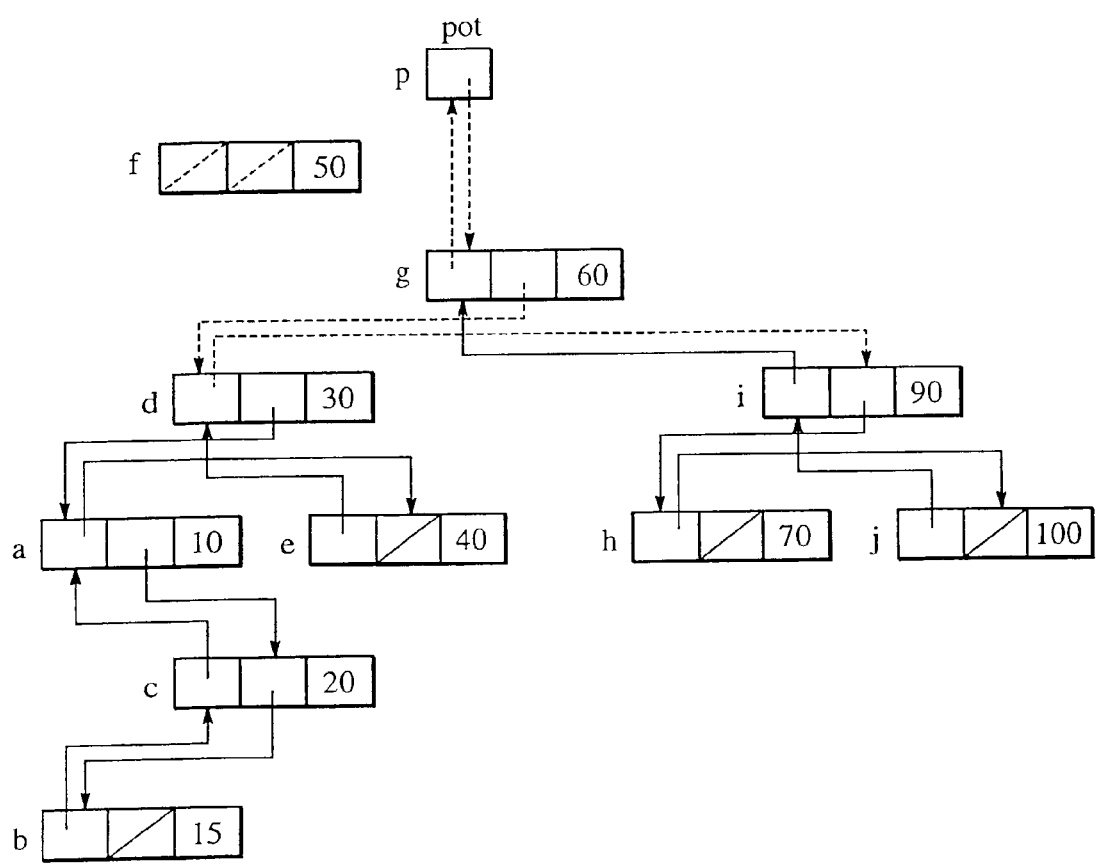
FIG. 14 is a diagram showing an example of the data structure in FIG. 12 after a modification operation has been performed.

To begin with, both of the data structures in the two computers are assumed to be exactly the same as FIG. 12. Here, a modification operation such as deleting the root node with 50 as a key is performed so as to make a structure, which has as a new root node, the node having 60 as a key. FIG. 14 shows the data structure after this modification operation. The modified pointers differing from FIG. 12 are indicated by the dashed line arrows in FIG. 14. In the post-deletion binary search tree, apart from the two pointers for the deleted node f, it can be understood that four pointers including the pot have been modified.

Here, the modification transmission unit 111 of the data structure management unit 10 according to the first embodiment does not transmit all of these modified pointers and their stored addresses to the modification [transmission] unit 311 of the data structure management apparatus, which manages other data structures one by one; but transmits only the pointer information, which is stored in the even numbered addresses or the start addresses of the nodes, out of the pointers to be modified when the same modification operation is performed as for the standard configuration in FIG. 13, together with the addresses.

Figure 15:
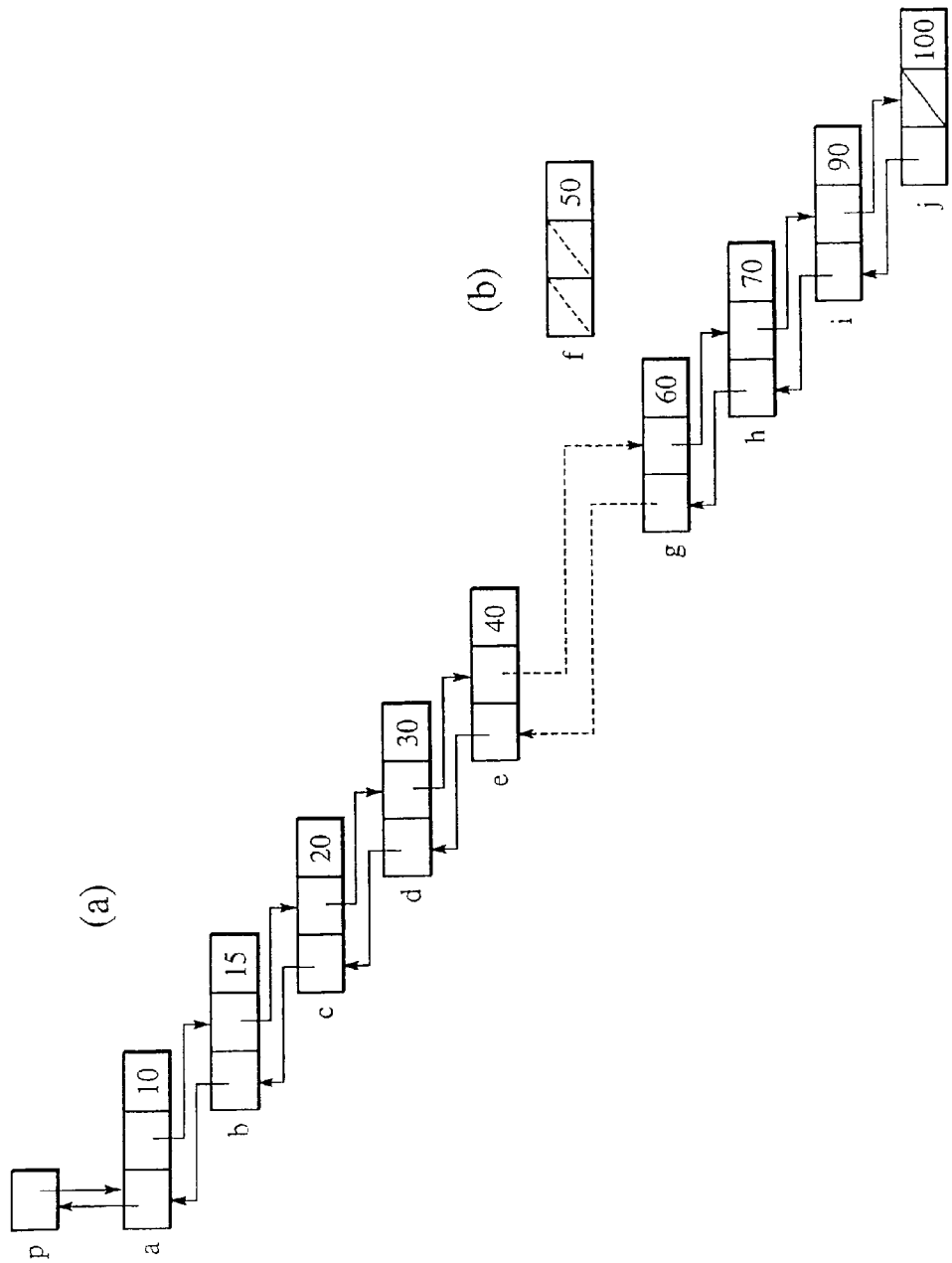
FIG. 15 is a diagram showing an example of the standard configuration in FIG. 13 after a modification operation similar to that in FIG. 14 has been performed.

FIG. 15 shows the standard configuration corresponding with FIG. 14. In the standard configuration of this FIG. [15], either one or both sets of the two addresses and value combinations of <value e of address g> and <value 0 of address f> from the four pointer values differing from FIG. 13, namely, the value e of the address g, the value g+1 of the address e+1, the value 0 of the address f, and the value 0 of the address f+1, are transmitted as the modified data to the copy side data structure management apparatus 30 of the other computer.

The modification reflection unit 301 of the copy side data structure management apparatus, which has received the modified data via the modification reception unit 311, performs the operation to delete the f address node from the binary tree on the assumption that the address f is used for a binary tree node as shown in FIG. 12 when, for example, only <value 0 of address f> is transmitted. This operation of node deletion is carried out with the same procedure as the master side data structure management apparatus 10 used when performing the previous modification. As a result, the same structure as in FIG. 14 is created by the modification reflection unit 301.

On the other hand, even when only <value e of address g> is transmitted, when employing the standard configuration of FIG. 13, the pointer value f that address g should contain can be obtained by calculating the node address to the immediate left of [node] g at the intermediate level of the binary tree in FIG. 12. With this modified data, the modification reflection unit 301 detects the fact that the this address g pointer value has been changed, and finds that the value of the e+1 address in the standard configuration in FIG. 13, before being changed, in response to this modified data, to g+1 in FIG. 15, is f+1, as with the case of the above-mentioned address g. This confirms that the value of the address g before modification is f and the value of the address e is f+1 respectively, and allows it to be determined that the operation to delete the node f is performed on the master side data structure management apparatus 10 side. Based on this determination, the copy side data structure management apparatus 30 deletes the f address node with the same procedure as the master side.

Basically, combinations of addresses and values, which are sufficient for accurately determining what kind of modification operation has been performed by referencing the standard configuration, may be transmitted from the modification transmission unit 111 to the modification reception unit 311. For example, even without actually making the content of the f address be 0, which is particular to the deletion operation, by transmitting <value 0 of address f>, it may be communicated to the copy side that the f address node has been deleted.

Note that in order for the copy side data structure management apparatus to determine that these addresses a through j are used as nodes, these addresses may be retained as a part of the memory content in the memory device and referenced. Alternatively, since the operation is carried out with that knowledge, the modification transmission unit 111 may transmit the combination of the addresses and values, which are attached with the effect that said addresses are the (even) addresses of these nodes, to the copy side modification reception unit 311.

Also, as a method of copying the master side data structure as a whole into the (copy side) data structure storage unit 20, which did not hold any of the target data structure, the entire output of the modification log may be stored in the master side data structure management apparatus 10, whereby this modification log is input successively to the copy side data structure management apparatus 30, so as to reconstruct the data structure.

As described above, by merely transmitting modified data for fewer pointers than the actual modified pointers, modifications made to one data structure may be reflected upon another data structure more effectively.

(2) Node Addition

Next, the modification reflection procedure of adding nodes to the data structure is described.

For example, in the data structure of FIG. 14, re-adding the node of address f to the binary search tree, which makes the address p be the pot, is considered.

Figure 16:
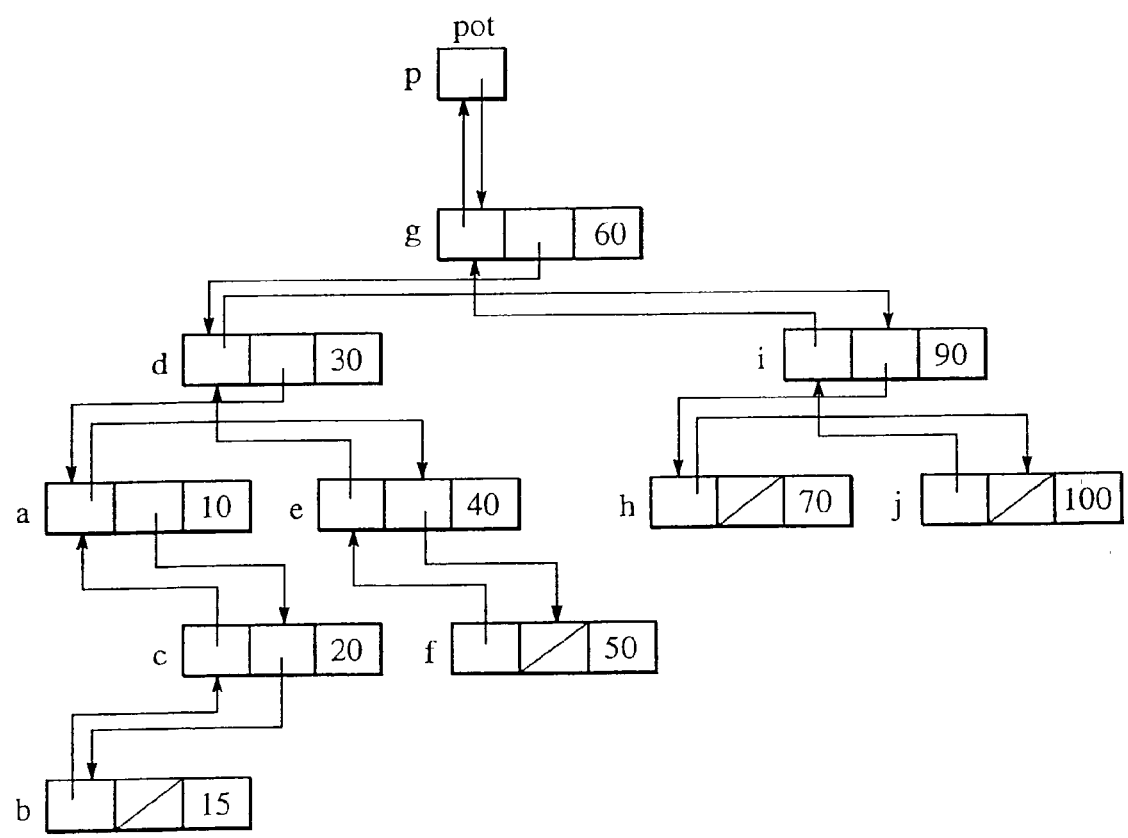
FIG. 16 is a diagram showing an example of the data structure after a modification operation that adds to the data structure in FIG. 14 has been performed.

FIG. 16 shows the binary search tree data structure after addition of this address f node. To begin with, the tree is searched with 50 as the key to add the address f node as the right child of the node e, which has no right child as shown in FIG. 16. Since the standard configuration corresponding to FIG. 16 is equivalent to FIG. 13 as with FIG. 12, the difference between the standard configuration in FIG. 13 and the configuration in FIG. 15 is the four pointers: value f of address g, value f+1 of address e+1, value e of address f, and value g+1 of address f+1.

The master side modification transmission unit 111 transmits to the copy side modification reception unit 311 either one of <value e of address f> or <value f of address g> from these four pointers.

When <value e of address f> is received, the copy side modification reflection unit 301 checks that the value of address f is 0 under the conditions of FIG. 14. The modification reflection unit 301 determines that the transmitted pointer value denotes an instruction to perform modification of the structure of FIG. 14 into any one of possible structures corresponding to the standard configuration of FIG. 13 where the node f in the standard configuration of FIG. 15 corresponding to that of FIG. 14, which is not included in the tree, is added as the child to the immediate right of the node e, such as the structure of FIG. 16, thereby performing an operation of adding the node f so as for it to be positioned immediately right of (immediately after) the node f in the intermediate level. The procedure for this adding operation may be the following procedure.

a. Letting x be the specified node, the to-be-added y node is added so as for it to be positioned just before (or immediately after) the node x in the intermediate level. Namely, b. If x has no left (or right) child, regard y as the left (or right) child of x, and terminate processing. If x has a left (or right) child, make the left (or right) child a new x.

c. If x has no right (or left) child, regard y as the right (or left) child of x, and terminate processing. If x has a right (or left) child, re-execute [function] c. by making the right (or left) child the new x.

d. When an empty tree is designated, regard the node x to be added as the root.

Meanwhile, when <value f of address g> is received, the modification reflection unit 301 performs the adding operation so that the node f is positioned to the immediate left of the node g (immediately before, in the sorting order) in the intermediate level upon determination that the node g is included in the tree, and the value of address g in the standard configuration is not f but e. This adding operation may also be performed with the functions a. through d. described above.

In either case, a structure identical to that shown in FIG. 16 may be obtained.

As described above, not all of the modified pointers are sent successively, but just by sending a part of the modifications made to the pointer in the standard configuration, it is possible to accurately reflect a modification performed on a structure, onto another structure, and maintain uniformity (functional equivalence) therebetween. It should be noted that in the above-mentioned specific example, two data structures were described; however, even in the case of three or more, uniformity among the plurality of data structures may be maintained by sending the same pointer value modification data from the directly modified data structure to the other data structures.

Furthermore, it is not always necessary for the to-be-transmitted pointer modification data to be the actual pointer values and the pointer stored addresses in the standard configuration. Corresponding to modification operations, operation content may be efficiently created by the outgoing data extraction unit 107, and efficiently reconstructed by the copy side modification reflection unit 301, whereby format is not important if the modified data is equal to the pointer modification data.

It should be noted that in the first embodiment, the memory element that stores the pointer for the binary tree root is regarded as the pot, and the pointer for the pot is stored in the root node of the tree. With this configuration, the content of a modification in the master-side data structure may be accurately reflected onto the copy-side data structure by merely transmitting the modification information for the pointer stored in the node even if the to-be-modified node on the copy side and/or master side is the root, as with the case of a modification made to the nodes other than the root.

The case where the copy-side data structure, which has received <value 0 of address f>, takes the node f as the root, as shown in FIG. 12, will be described as an example. Recognition of the pointer p for the pot stored in [f] allows for a normal post-deletion data structure, for example that in FIG. 14, to be created by setting p to the element [g] of the node g, for example, which is the new root node after f is deleted, and setting g to the element [p] of the pot p.

The binary search tree may take on many different structures even if they are functionally equivalent, and a structure with an arbitrary node as the root is possible. When the tree structure differs on the master side and on the copy side, it is possible for the node to be a root on the copy side even if it is not a root on the master side. In the case of the structure where the pointer for the pot is not stored in the root node as in FIG. 3, modification of the root node requires to specify the variable that references thereto (equivalent to the pot) and modify such that a new root is referenced. It is not possible for the master side to know whether or not the target node for modification is the root on the copy side. Therefore, when any of the nodes are modified, if the modification causes there to be even a slight possibility for modifications to the variable which references the root on the copy side, the modification information attached with the addresses of these variables must be sent.

As with the first embodiment, if the pointer that designates the pot to the root is stored, if necessary, the pot address may be obtained from the respective nodes of the tree via the root, hence a modification operation may be performed on the root node even without the pot address being designated. Accordingly, there is no need for transmitting the pot address from the master side to the copy side. However, when a node is added to an empty pot or when the root node in the standard configuration is modified, the pot address is transmitted. Nevertheless, even in these cases, the pot address is treated the same as a node address as the new pointer value for a node element, and is not transmitted as special additional data.

Figure 19:
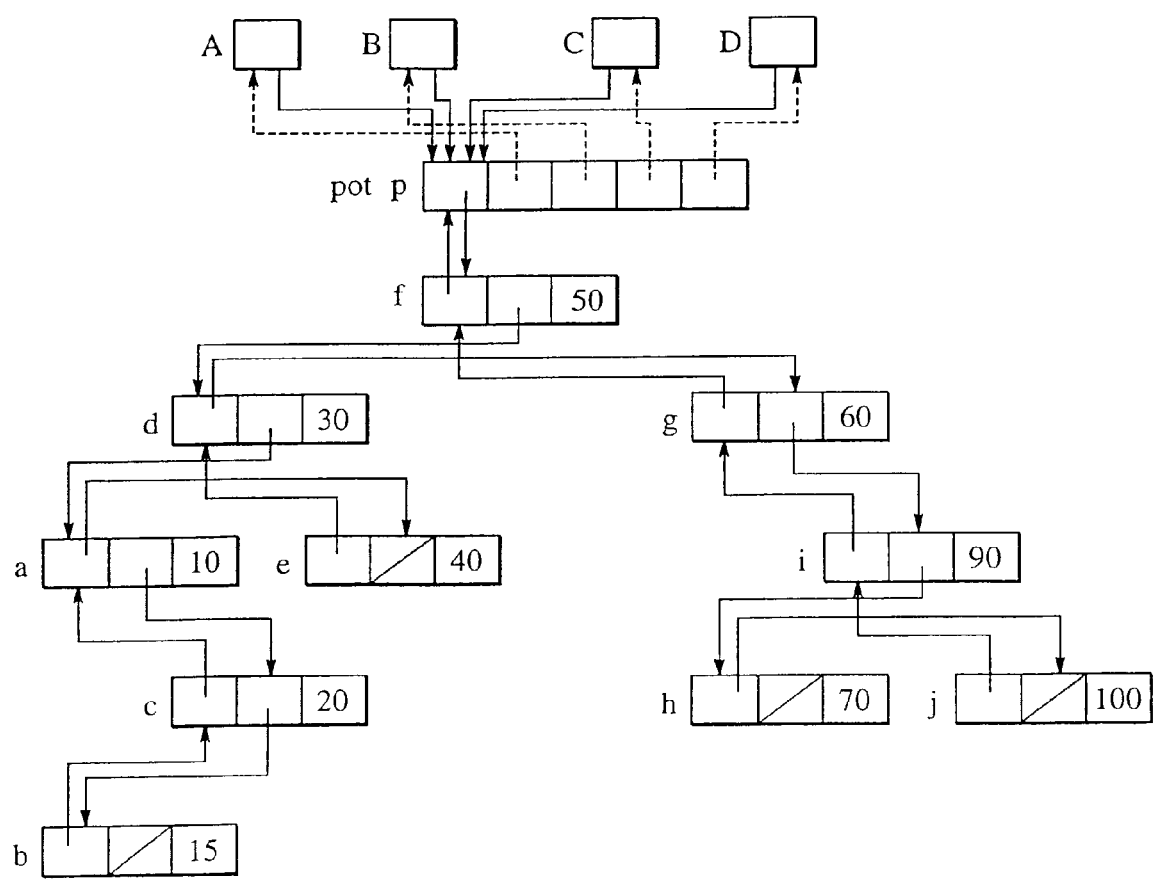
FIG. 19 is a diagram showing an example of a pointer structure with a pot according to a modified example of the first embodiment and variables referencing this pot.

It should be noted that in the first embodiment the variable referencing a tree (the root of a tree) is described using a single pot, however, in the case where there are a plurality of variables referencing a tree, if the configuration employed is that of FIG. 19 wherein the tree is accessed via a single pot, equivalency in the data structure may be maintained between the master-side and the copy-side without making any changes to method described above. Moreover, as shown in FIG. 19, if the pointers for each variable referencing that pot are stored on the pot side, modifications to conditions such as which pot is being referenced by each variable may be processed by transmitting them as these pot side pointer modifications.

Figure 20:
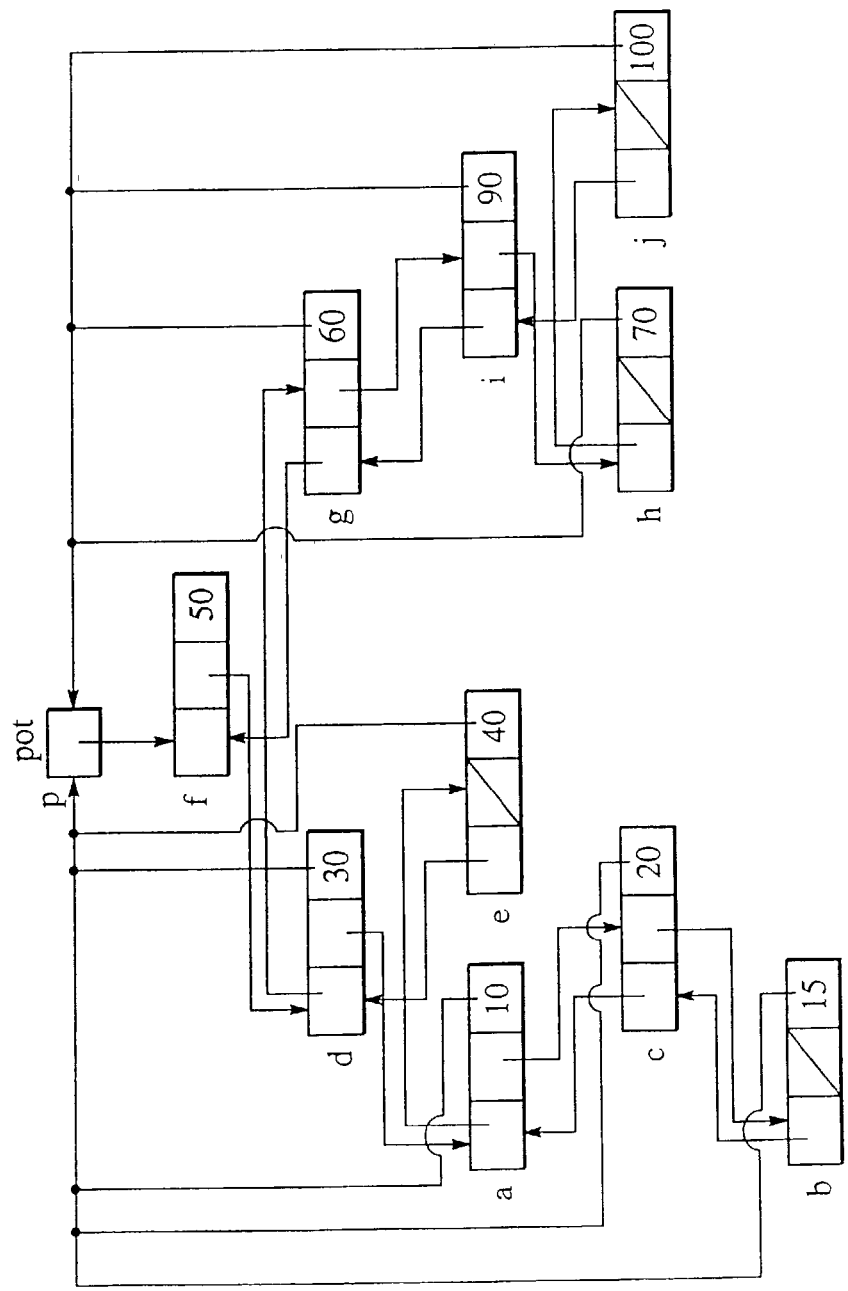
FIG. 20 is a diagram showing an example of a pointer structure between a pot according to a modified example of the first embodiment and each node configuring the data structure.

With the first embodiment, since the pointer for a pot is stored in a memory element storing the pointer for the parent or the right sibling of the root node, no additional memory resources are necessary to configure the data structure including the pot. Moreover, besides these compact methods of implementation, as shown in FIG. 20, a configuration where each node stores a pointer for the pot may be employed. In this case, there is no need for a pointer for the pot to be stored in the element storing a pointer for the parent or right sibling of the root node.

In the first embodiment, by including elements stored with a pointer for the root of the binary tree and storing a pointer for the pot in at least one node, a modification operation on a root may be performed even if the pot address is not designated. Accordingly, when the modified information is transmitted from the master side to the copy side, only the pointer change information stored in the node needs to be transmitted, and the address of the variable that refers to (the root of) the tree need not be attached. In addition, in such configuration, the number of pots is not limited to one, and may be provided in plural.

Not only with the binary tree according to the first embodiment, but also in common dynamic data structures configured with pointers, once a known address for part of the storage element is provided, access such as a search may be started from the element. In the binary tree, the root node is such an element, and the binary search is applied from there. In a data structure that is modified dynamically, such element (such as a root node) may be modified; however, the element (variable) referencing such an element must also be changed along with that modification. In order to change these variables, the addresses of these variables or the information for determining the addresses must be transmitted from the master side to the copy side.

The first embodiment provides a storage element (pot) with an address that does not change dynamically as a part of the data structure, and stores as the function in the data structure the correspondence between an element with an address that may be dynamically modified (a root node or individual node), and the element with an address that does not change; in other words, stores a pointer for the pot in a root node or in each node. Therefore, the hassle of transmitting the address of the variable that maintains reference to the data structure at every change operation may be omitted.

Moreover, not only is the hassle of transmitting from the master side to the copy side reduced, but also the pot address (the address for the variable which maintains reference to the data structure) need not be designated as input to the data structure modification unit even when the change operation is performed in the individual data structure (for example only on the master side). This eliminates the restriction that an address for the variable that maintains reference to the data structure must be known as a prerequisite to a modification operation, and the degree of freedom as far as the applicability of the change operation to the data structure increases considerably.

In addition, for example, when performing an operation for deleting a node from the data structure, in the case where the node to be deleted is the sole node in the data structure, it is necessary that modification be made so that the data structure or the variable pot referencing that node does not end up referencing an invalid node. Accordingly, it is necessary for a known address for the pot to be provided; however, information denoting the pot other than the node to be deleted needs to be designated unless there is means for knowing the pot of the binary tree to which the node belongs, from that node. The designation is not always required in all of the above described deletion operations; however, extra time and storage resources are required should measures such as the following be taken:

(1) designation after determination of whether or not it is necessary, (2) designation without regard to whether or not it is necessary, and (3) limiting use of the data structure so as to not fall into circumstances that require designation; for example, always using at least one a node (even if it be a dummy node).

In particular, when there is a danger that the deletion operation may be performed in a situation where it is impossible to know the pot that is to be designated, the only possible measure for avoiding this situation is the above-mentioned (3).

Since the same situation arises in the case where the root node is deleted (and the node to be deleted happens to be the root node), or when the root node is replaced, for example with a splaying operation, there are many occasions where additional resources are required for the countermeasures such as the above (1), (2), and (3).

If the data structure comprises means for knowing the pot from the node as with the first embodiment, there is no need to designate the pot unless it is truly necessary, a modification operation may be performed by designating only the node to be operated, and in addition there is neither a limit on the usage of the data structure as described above in (3) nor are additional resources required.

With the first embodiment, the following effects may be obtained.

The data structure management system according to the present invention focuses on modifications of pointer information in the standard configuration of an arbitrary data structure, generates modified data by omitting from the modified pointer information the pointer values that can possibly be assumed or restored if the standard configuration is assumed, and transmits it. Through this, the modification data communications traffic may be reduced and the processing time for change reflection processing reduced without alerting the data structure modification program.

It should be noted that with the addition example described above as a modified example of the first embodiment, the above-mentioned modification reflection processing may be applied even when the copy side data structure as shown in FIG. 17 is different from the master side data structure such as in FIG. 14.

Figure 18:
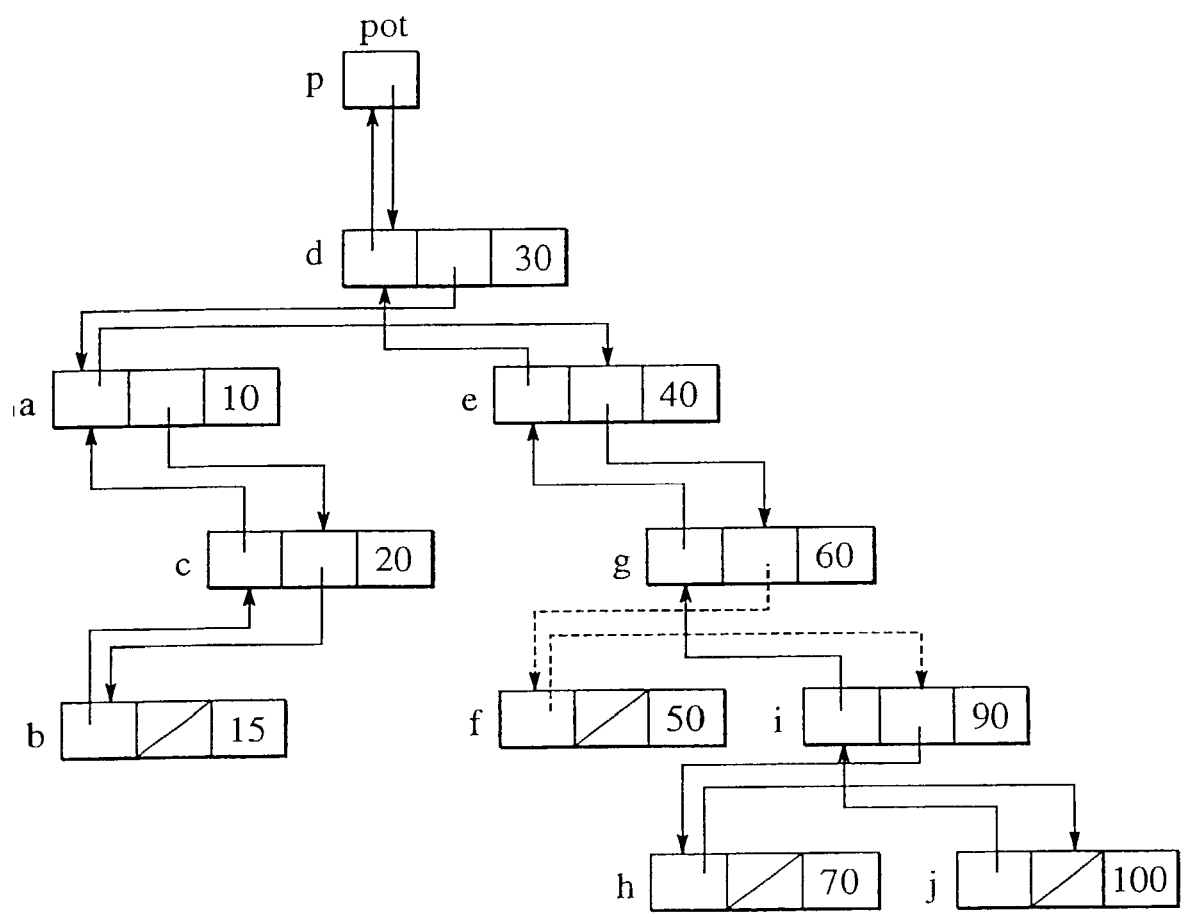
FIG. 18 is a diagram showing an example of a data structure that is obtained through [performing] a node adding operation on the data structure in FIG. 17 and that is equivalent to the data structure in FIG. 16.

By receiving the <value e of address f> or the <value f of address g> and adding the node f using the above function, modification may be applied to a binary search tree such as the configuration shown in FIG. 18, which is equivalent to that in FIG. 16.

In this manner, even if configuration differs between the master side and the copy side or a plurality of copies have respectively different configurations, equivalence may be maintained among these by merely transmitting a portion of the pointer modification in the standard configuration.

Second Embodiment

In the following, a data structure management apparatus, data structure management system, data structure management method, and data structure management program according to a second embodiment of the present invention are detailed only in respect to only those aspects that differing from the first embodiment while referencing FIG. 21 through FIG. 23.

Instead of transmitting an address that acts as pointer information to a copy side data structure as the first embodiment provides, the second embodiment provides a function for transmitting relative location information. More specifically, the second embodiment stores partial segment lengths disclosed in "Segment Management Method" (Japanese Patent No. 2768921) in addition to the key in each node of the data structure and performs a search of the node with the location of the segment and calculation of the segment corresponding with the node.

Figure 21:
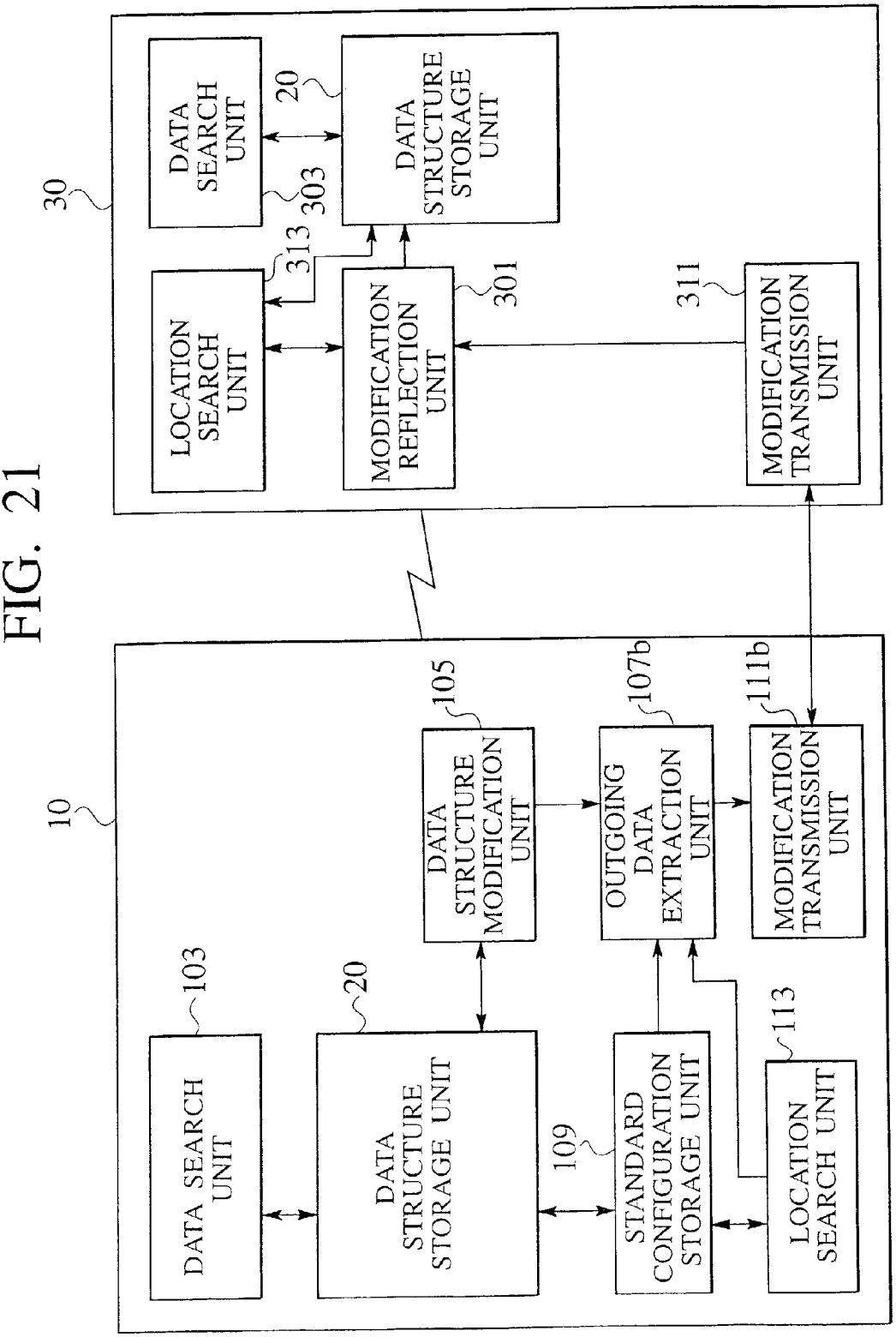
FIG. 21 is a block diagram showing the functional configuration of a data structure management system according to a second embodiment of the present invention.

FIG. 21 is a block diagram showing the functional configuration of a data structure management apparatus according to a second embodiment of the present invention. When compared to the first embodiment, the second embodiment as shown in FIG. 21 is a variation of the first embodiment that is further equipped with a location search unit 113 in the master side data structure management apparatus 10 and the location search unit 313 in the copy side data management apparatus 30.

The location search unit 113 and the location search unit 313 perform a node search using the segment location and a calculation of the segment corresponding to the node.

As the rest of the configuration is similar to that with the first embodiment in FIG. 1, a description thereof is omitted.

FIGS. 22 (a) and (b) show an example of a data structure according to the second embodiment. In FIGS. 22 (a) and (b), the segment lengths corresponding to each node are all 1, and the end of each segment represents the ranking from the left of that node in the LCR order.

An outgoing data extraction unit 107b in the master side data structure management apparatus 10 obtains, via the location search unit 113, a pointer value, which is in the standard configuration in the standard configuration storage unit 109 and which has been modified as a result of the modification operation, and the address where the pointer is stored as the location information. This location information is represented by a combination of the offset from the start of the node, which includes the address in the pre-modification condition, to that address, the value of that node segment (ranking) within the binary tree in which that node lies; and the address of the pot of that binary tree. This location information is transmitted to the modification reception unit 311 in the copy side data structure management apparatus 30.

The modification reflection unit 301 of the copy side data structure management apparatus 30, based on modified data or the relative location information received by the modification reception unit 311, determines the tree root corresponding with the pot by the pot address, specifies the segment (ranking), and indicates this to the location search unit 313. The location search unit 313 calculates the address of the segment that has that location (that ranking) by determining the address of the node (the start address) in the copy side data structure and adding an offset to the determined start address.

In FIGS. 22 (a) and (b), the address f, for example, is represented as <address of offset 0 of the node with ranking 1 of the pot at address q>. In addition, the address e is expressed as <address of offset 0 of the node with ranking 5 of the pot at address p>. Accordingly, instead of, for example, <value e of address f>, the contents of the modified data transmitted by the modification transmitting unit 111 become location information shown by information such as <address of offset 0 of the node with ranking 5 of the pot at address p is stored at the address of offset 0 of the node with ranking 1 of the pot of the address q>.

It should be noted that, the points differing from the first embodiment in regards to the condition of the data structure and the modification operation, is that addresses other than the pot are designated by the respective offsets from the nodes. Because of this, the node f belongs to the pot q tree even before it has been added to the pot p tree. The modification operation involves, as shown in FIGS. 23 (*a*) and (*b*), adding this in once the node f has been deleted so that it falls to the immediate right of node e in the LCR order.

According to the second embodiment, the following effects may be obtained.

In short, since relative location information is transmitted for the modified data, it is not always necessary for the corresponding nodes to occupy the same address in the master side data structure and the copy side data structure. Accordingly, even if the size and the usage of the storage region (address space) differ between the master side and the copy side, equivalency among the above-mentioned data structures may be implemented, and applications of the invention may be remarkably expanded.

It should be noted that methods other than the segment management method described above may be employed as methods of identifying a node in a binary tree (binary search tree).

For example, as shown in FIGS. 23 (*a*) and (*b*), as in the case where all of the keys for each node are different, a key may be used to identify a node that is to be modified if there are no nodes having the same key as that node existing on the tree, neither before nor after modification.

In addition, in the case where addresses of pots among a plurality of data structures match, the above description allows addresses of nodes to differ, however, the reverse also holds: although there are common node addresses, the pot addresses are allowed to be different. As for modifications to the standard configuration, however, a pot address is transmitted as modified data only when the node at the left end, which is the root, changes.

It should be further noted that extensions of the above-mentioned methods are possible, such as in the case of sections comprising pots and nodes with respective addresses that are different for each data structure, a technique of transmitting and receiving, between the master side modification transmitting unit 111*b* and the copy side modification receiving unit 311, sufficient data that allows calculation of corresponding address relative to a common address in a data structure using the combination of data and an offset, which designates a node or a pot.

Third Embodiment

Hereinafter, the third embodiment according to the present invention of a data structure management apparatus, a data structure management system, a data structure management method, and recording media, which store a data structure management program, while referencing FIG. 24 through FIG. 26, will be described in detail only in respect to the differences from the first and second embodiments.

Figure 24:
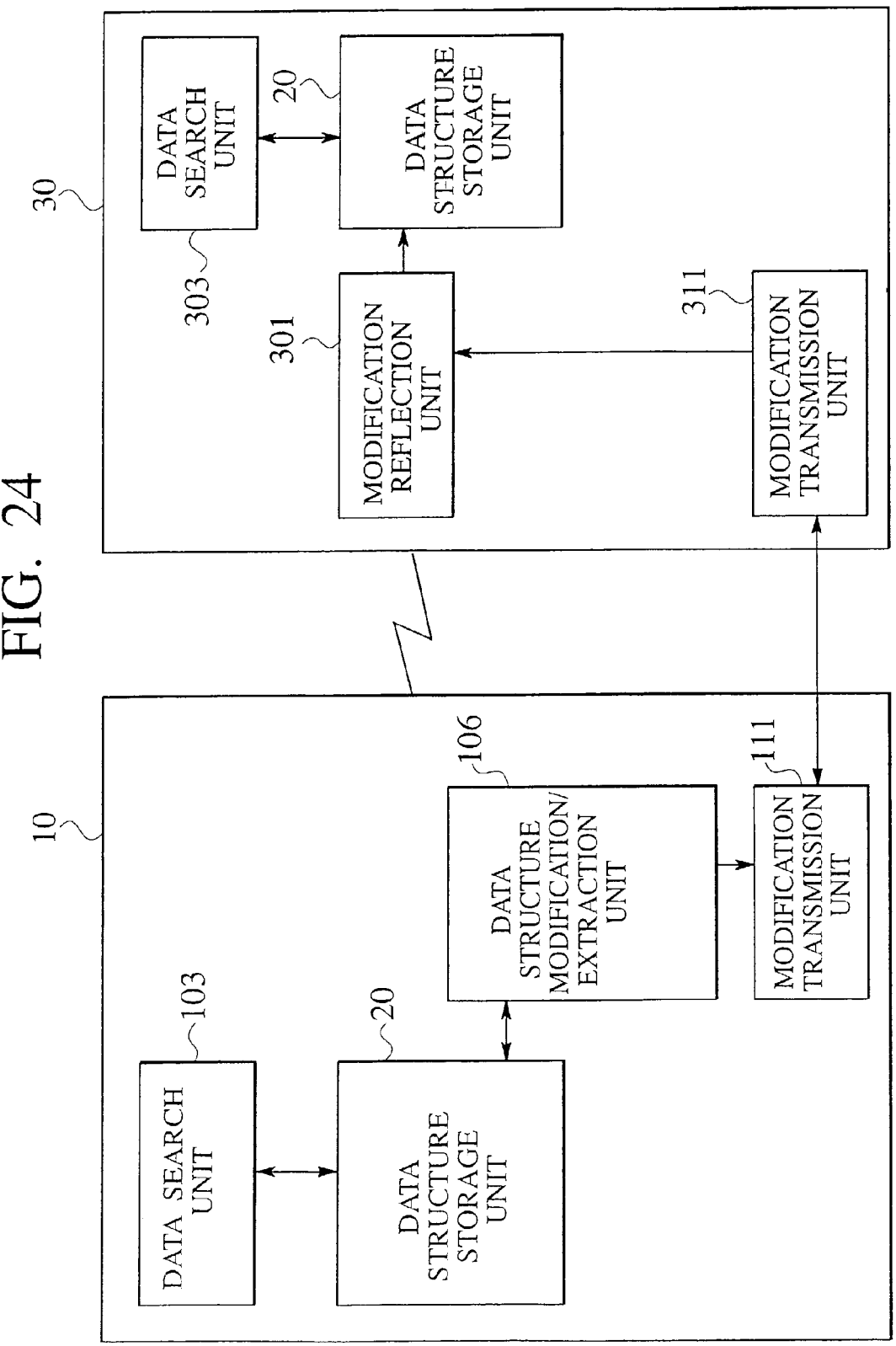
FIG. 24 is a block diagram showing a functional configuration of data structure management system according to the third embodiment of the present invention.

FIG. 24 is a block diagram showing a functional configuration of the data structure management apparatus according to the third embodiment. As shown in FIG. 24, the third embodiment differs from the first and second embodiments, whereby it is a modification of the first embodiment in the respect that instead of having a master side standard configuration storage unit 109, it is equipped with a data structure modification/extraction unit 106, which has a combined function of the data structure modification unit 105 and outgoing data extraction unit 107 of FIG. 1.

In the first and second embodiments, the outgoing data extraction units 107, 107*b* extract or, in addition, if necessary, converts only the modifications to the standard configuration, which is stored in the standard configuration storage unit 109, from the pointer modification information that is output from the data structure modification unit 105, outputting to the modification transmission units 111, 111*b*.

On the other hand, in the third embodiment, while the data structure modification/extraction unit 106 is modifying the data structure of a data structure storage unit 20, the value of a pointer to be modified in the standard configuration on the data structure of that which is to be modified is calculated, outputting only the necessary modified data to the modification transmission unit 111.

Accordingly, when the modifications of the resources and data structure required for maintaining the standard configuration in the standard configuration storage unit 109 are made, the hassle of modifying this standard configuration may be avoided. Simultaneously, the hassle of the outgoing data extraction unit 107, which extracts the modified data that is once output from the data structure modification unit 105 by referencing the standard configuration, may be reduced.

The third embodiment utilizes the same binary trees as the data structure in the first embodiment. The data structure modification/extraction unit 106, in accordance with the modifying operation, uses the actual data structure of that which is to be modified, which is stored in the data structure storage unit 20, for extracting the necessary modified data.

The processing procedure of a modification reflecting process concurrent with the data structure modifications in the third embodiment is described below.

(1) Node Deletion

For example, when deleting the node f in the data structure of FIG. 12, it is necessary to obtain <value e of address g> or <value 0 of address f> as modified data. The <value 0 of address f> may be produced without particularly referencing the standard configuration, however, <value e of address g> cannot be easily obtained from the data structure of FIG. 12. The data structure modification/extraction unit 106 according to the third embodiment modifies the data structure of FIG. 12, in other words deletes the node f, by utilizing a splaying operation that processes a self-adjusting binary tree, and determines <value e of address g> in the post-deletion standard configuration as in the following:

(i) To begin with, apply splaying to the node f to be deleted, making f the root node. Since f is already the root node in FIG. 12, it may be regarded as the finished state of this operation.

Figure 25:
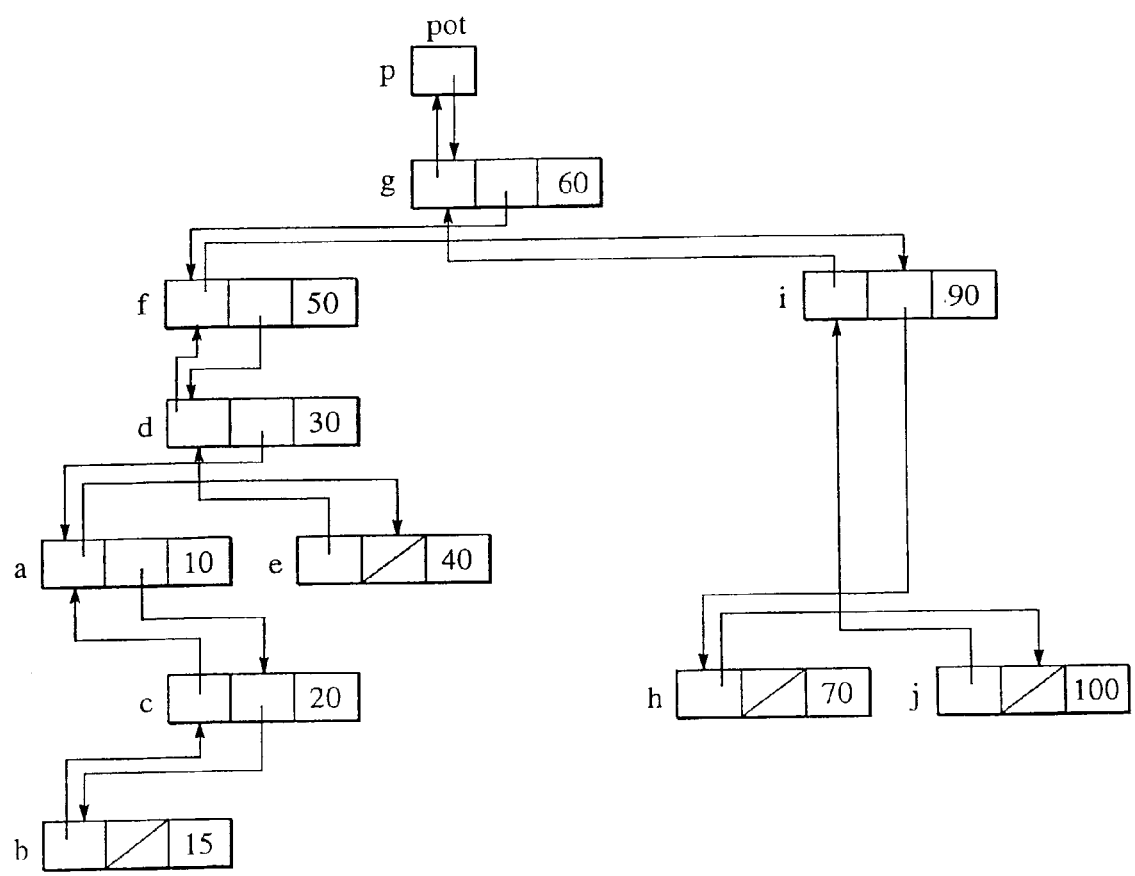
FIG. 25 is a diagram that shows a data structure which is the data structure of FIG. 12 after a node g, which is located to the immediate right of the root node f, is subjected to splaying and the node g is shifted to the position of the root.

(ii) Next, search for the immediate right node g and immediate left node e of the node f in the LCR order and apply the splaying operation to g so as to shift g to the root node thereof as shown in FIG. 25.

Figure 26:
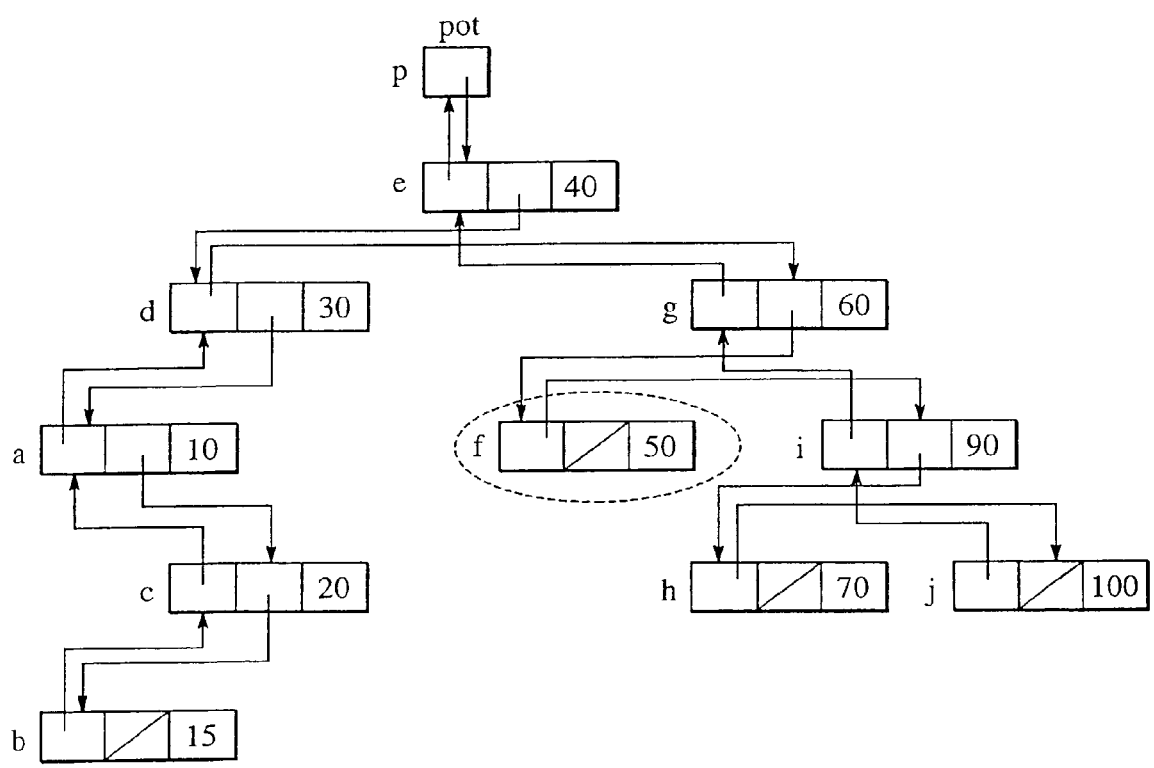
FIG. 26 is a diagram that shows a data structure which is the data structure of FIG. 25 after a node e, which is located to the immediate left of a node f, is subjected to splaying and the node e is shifted to the position of the root.

(iii) Finally, by applying the splaying operation to f's immediate left node e, and shifting e to the position of the root, the structure between the nodes e, f, and g is as shown in FIG. 26.

(iv) If the node f is deleted in the state of this FIG. 26, a structure where the node g becomes the right child of its immediate left node e in the LCR order and the node g itself has no left child is obtained. This structure matches the relationship between e and g in FIG. 15, which is a diagram of the standard configuration after deletion of the node f, wherein <values e of address g> are also identical.

As such, in the case of deleting nodes, if deletion is performed after performing the splaying operation in the order of the node to be deleted, its immediate right node and its immediate left node, then the structure between its immediate left node and its immediate right node will definitely match the standard configuration where "its immediate right node has no left child, and it is the right child of its immediate left node". Utilizing this, the modification transmission unit 111 may extract the modified data that should be transmitted (<value e of address g>, in the above example) directly from the data of the data structure storage unit 20.

(2) Node Addition

When adding the node f in the data structure of FIG. 17, the following procedure is implemented.

(i) To begin with, add the node f to an appropriate position, modifying it into the data structure as shown in FIG. 18.

(ii) Next, apply the splaying operation to the node f and shift to the position of the root; in addition, search for the node f's immediate left node e and apply the splaying operation thereto.

(iii) As a result, the node f has no left child and becomes the right child of (root node) e, whereby the relationship between the node e and node f matches the standard configuration of FIG. 13. From this obtained structure, the modification transmission unit 111 may extract <value e of address f> that should be transmitted.

(iv) In the same way, search for the immediate right node of the node f in the LCR order, and after first applying the splaying operation to the node g, continue to apply the splaying operation to the node f.

(v) As a result, the node g has no left child and becomes the right child of (root node) f, whereby the relationship between the node f and node g matches the standard configuration shown in FIG. 13. From this obtained structure, the modification transmission unit 111 may extract <value f of address g> that should be transmitted.

According to the above procedure, without particularly referencing the stored standard configuration, the data structure modification/extraction unit 106 may be structured such that the pointer values in the standard configuration are calculated and output to the modification transmission unit 111 by utilizing the data structure of the data structure storage unit 20.

It should be noted that in the third embodiment, after applying the splaying operation and actually transforming the data structure, by reading out the address content of a predetermined node, the extraction of modified data was performed. However, without actually performing the entire procedure, depending on the node to be operated and the LCR order, if its immediate left or immediate right node is required for every type of operation (node deletion, addition), modified data to be ultimately extracted may be produced. In this case, it is not necessary for the standard configuration to be even partially retained in the data structure of the data structure storage unit 20. Here, since the modified data to be extracted is the values of the pointers in the specified standard configuration, it can be understood that the data structure modification/extraction unit 106 performs a calculation that is equivalent to referencing the standard configuration.

A characteristic of the present invention is that the modified data to be transmitted to the modification reception unit 311 from the modification transmission unit 111 is the pointer value (variable value) in the standard configuration. Even if this modified data is extracted or calculated in any manner, there are no differences in the functions and results.

Accordingly, even applying various methods to the techniques of extraction and calculation does not deviate from the aim of the present invention.

It should be noted that in the above-mentioned embodiment, data that is sorted as a data structure (binary search tree) is handled. This standard configuration is set so as to correspond the data's sorting order and the linking order of the nodes, and is configured such that only the modifying operation, which exerts an effect on the sorting order, changes the linking order of the nodes. If the same sorting order of the data is represented, there will be no functional differences even with differing data structures. Accordingly, the above-mentioned embodiment with a data structure that handles sorted data is an example of one that extracts only the modifications that generate functional differences as modifications of the pointers in the standard configuration.

It should be noted that the present invention is not limited in any way by the embodiments described above, whereby it goes without saying that various modifications and variations thereto can be made without deviating from the aim of the present invention.

INDUSTRIAL APPLICABILITY

A data structure management apparatus, a data structure management system, a data structure management method, and computer readable recording medium, which records a data structure management program according to the present invention, allow for easily and efficiently maintaining the equivalency among a plurality of data structures in one or a plurality of storage regions upon one or a plurality of computers by sending and receiving modification data with little communication traffic. In addition, even though the data structures are stored in respectively differing addresses, maintenance of their equivalency is possible. Furthermore, the pointer structure among a plurality of computers upon the network may be efficiently reproduced, and may be suitable for various systems, for example, a highly reliable system and the like.

As such, by utilizing the present invention, the data structures are made common among a plurality of computers upon the network, wherewith management of the storage regions in each of the computers, which share these data structures, may respectively be independently and effectively performed, which is valuable.

The invention claimed is:

1. A data structure management apparatus that structurally retains and manages plural pieces of data structure that are stored in one or a plurality of storage units and carries out operations of data retrieval, addition, update, and deletion so that each of the operation with respect to the plural pieces of data structure results in consistent results, comprising:

a data structure storage unit configured to store an arbitrary first data structure;

a data structure modification unit configured to modify said first data structure;

a standard configuration storage unit configured to store a standard configuration in which all nodes contained in said first data structure are arranged in a descending or ascending order, and every node contains a pointer for only one of either a right or left child node, or contains no pointers for a child node;

a data extraction unit configured to extract, as modification data in said first data structure, only a portion of pointer information container in a node of which a sorting sequence is changed in said standard configuration by the same modification operation performed with respect to said standard configuration as that performed by the data structure modification unit; and a modified data transmission unit configured to output the extracted modification data necessary for keeping a second data structure equivalent so as to reflect the modification data in said second data structure, wherein said first data structure and said second data structure contain all of the same data, have the same sorting sequence, but the first data structure has a different pointer structure from that of said second data structure.

2. The structured data management apparatus according to claim 1, wherein the first data structure is arranged in a binary search tree.

3. The data structure management apparatus according to claim 1, wherein said data extraction unit is configured to extract a portion of modified pointer information contained in each node on the first data structure as the modification data.

4. The data structure management apparatus according to claim 1, wherein said data extraction unit is configured to extract, upon deletion of a node, data indicating modification to a pointer of a deleted node into a non-referencing state as the modification data.

5. The data structure management apparatus according to claim 1, wherein the first data structure comprises a memory element that stores a pointer to a root node.

6. The data structure management apparatus according to claim 1, wherein said data structure extraction unit is configured to generate the modification data as a group of an offset from a start of a node containing an address of an extracted pointer, a sectional value in the first data structure of the node, and a value designating the first data structure.

7. The data structure management apparatus according to claim 6, further comprising:
 a location retrieval unit configured to retrieve a node location in the second data structure; and
 a modification data reflection unit configured to perform modification at a node location in the second data structure that is retrieved by said location retrieval unit, based on the modification data.

8. The data structure management apparatus according to claim 5,
 wherein the memory element stores pointers to a variable that refers to the memory element.

9. The data structure management apparatus according to claim 5,
 wherein at least one node in the data structure that includes a memory element that stores a pointer to a root node is stored with a pointer to the memory element.

10. The data structure management apparatus according to claim 1, wherein said data extraction unit is configured to transform a portion of said first data structure into a portion of the standard configuration, thereby calculating the modification data.

11. The data structure management apparatus according to claim 1, wherein said data extraction unit sequentially shifts a node to be modified and an immediate left node and/or an immediate right node thereof to a root node in said first data structure so that said first data structure is transformed, thereby calculating the modification data.

12. A data structure management apparatus that structurally retains and manages plural pieces of data structure that are stored in one or a plurality of storage units and carries out operations of data retrieval, addition, update, and deletion so that each operation with respect to the plural pieces of data structure results in consistent results, comprising:
 a data structure storage unit configured to store a second data structure that is equivalent to an arbitrary first data structure;
 a modification data input unit configured to input modification data necessary for making said first data structure on a modification source side and second data structure on a modification target side equivalent based on modified pieces of data in said first data structure; and
 a modification data reflection unit configured to reflect the modification data upon said second data structure,
 wherein the modification data is generated by extracting only a portion of pointer information contained in a node of which a sorting sequence is changed in a standard configuration by the same modification operation performed with respect to the standard configuration as that performed in the first data structure;
 in the standard configuration, all nodes contained in the first data structure are arranged in a descending or ascending order, and every node contains a pointer for only one of either a right or left child node, or contains no pointers for a child node; and
 the first data structure and the second data structure contain all of the same data, have the same sorting sequence, but the first data structure has a different pointer structure from that of the second data structure.

13. As data structure management system that structurally retains and manages plural pieces of data structure that are stored in one or a plurality of storage units and carries out operations of data retrieval, addition, update, and deletion so that each operation with respect to the plural pieces of data structure results in consistent results, comprising:
 a first data structure management apparatus that includes:
  a data structure storage unit configured to store an arbitrary first data structure;
  a data structure modification unit configured to modify said first data structure;
  a standard configuration storage unit configured to store a standard configuration in which all nodes contained in said first data structure are arranged in a descending or ascending order, and every node contains pointer for only one of either a right or left child node, or contains no pointers for a child node;
  a data structure modification extraction unit configured to extract, as modification data in said first data structure, only a portion of pointer information contained in a node of which a sorting sequence is changed in said standard configuration by the same modification operation performed with respect to said standard configuration as that performed by the data structure modification unit; and
  a modified data transmission unit configured to output the extracted modification data necessary for keeping structured data equivalent, so as to reflect the modification data onto said second data structure, and
 a second data structure management apparatus that includes:
  a second data structure storage unit configured to store said second data structure that provides the equivalent retrieval function to said first data structure;
  a modification data input unit configured to input the modification data outputted from said modification data transmission unit of said first data structure management apparatus; and
  a modification data reflection unit configured to reflect the modification data upon said second data structure.

14. A data structure management method that structurally retains and manages plural pieces of data structure that are stored in one or a plurality of storage units and carries out operations of data retrieval, addition, update, and deletion so that each operation with respect to the plural pieces of data structure results in consistent results, comprising:
- a data structure modifying step for modifying an arbitrary first data structure;
- a standard configuration storing step for storing a standard configuration in which all nodes contained in said first data structure are arranged in a descending or ascending order, and every node, contains pointer for only one of either a right or left child node or contains no pointer for a child node;
- a data structure extracting step for extracting, as modification data in said first data structure, only a portion of pointer information contained in a node of which a sorting sequence is changed in said standard configuration by the same modification operation performed with respect to said standard configuration as that performed by the data structure modifying step; and
- a modified data transmitting step for outputting the extracted modification data necessary for keeping structured data equivalent, so as to reflect the modification data onto said second data structure,
- wherein said first data structure and said second data structure contain all of the same data, have the same sorting sequence, but the first data structure has a different pointer structure from that of said second data structure.

15. The data structure management method according to claim 14, wherein the data extracting step extracts a portion of modified pointer information contained in each node on the first data structure as the modification data.

16. A computer readable recording medium which records a program that causes a computer to execute a data structure management processing that structurally retains and manages plural pieces of data structure that are stored in one or a plurality of storage units and carries out operations of data retrieval, addition, update, and deletion so that each operation with respect to the plural pieces of data structure results in consistent results, the processing comprising:
- a data structure modification process for modifying an arbitrary first data structure;
- a standard configuration storing process for storing a standard configuration in which all nodes contained in said first data structure are arranged in a descending or ascending order, and every node, contains a pointer for only one of either a right or left child node, or contains no pointers for a child node;
- a data structure extraction process for extracting, as modification data in said first data structure, only a portion of pointer information contained in a node of which a sorting sequence is changed in said standard configuration by the same modification operation performed with respect to said standard configuration as that performed by the data structure modifying step; and
- a modified data transmission process for outputting the extracted modification data necessary for keeping structured data equivalent, so as to reflect the modification data onto said second data structure,
- wherein said first data structure and said second data structure contain all of the same data, have the same sorting sequence, but the first data structure has different pointer structure from that of said second data structure.

17. The computer readable recording medium according to claim 16, wherein
- the data extraction process extracts a portion of modified pointer information contained in each node on the first data structure as the modification data.

* * * * *